United States Patent
Nishibayashi et al.

(10) Patent No.: US 9,859,712 B2
(45) Date of Patent: Jan. 2, 2018

(54) POWER ELECTRONICS DEVICE, DEVICE DETECTION METHOD, AND PROGRAM

(71) Applicant: KABUSHIKI KAISHA TOSHIBA, Tokyo (JP)

(72) Inventors: Yasuyuki Nishibayashi, Kawasaki Kanagawa (JP); Kotaro Ise, Kawasaki Kanagawa (JP); Fumiaki Kanayama, Kawasaki Kanagawa (JP); Yuki Yonezawa, Kawasaki Kanagawa (JP); Ikuya Aoyama, Yokohama Kanagawa (JP); Akihito Takahashi, Fuchu Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 752 days.

(21) Appl. No.: 14/488,785

(22) Filed: Sep. 17, 2014

(65) Prior Publication Data

US 2015/0084416 A1 Mar. 26, 2015

(30) Foreign Application Priority Data

Sep. 20, 2013 (JP) .................................. 2013-196135

(51) Int. Cl.
*H02J 3/32* (2006.01)
*H02J 3/40* (2006.01)
(Continued)

(52) U.S. Cl.
CPC ................ *H02J 3/32* (2013.01); *H02J 3/383* (2013.01); *H02J 3/40* (2013.01); *H02J 3/48* (2013.01);
(Continued)

(58) Field of Classification Search
CPC ........ H02J 13/002; H02J 13/0024; H02J 3/32; H02J 3/40; H02J 3/42; H02J 3/48;
(Continued)

(56) References Cited

U.S. PATENT DOCUMENTS

| 9,263,895 B2* | 2/2016 | Naiknaware | ........ H02M 7/4807 |
| 2013/0033111 A1* | 2/2013 | Kawamoto | ............... G05F 1/67 |
| | | | 307/66 |

(Continued)

FOREIGN PATENT DOCUMENTS

| JP | 2002-135983 | 5/2002 |
| JP | 2002-199589 | 7/2002 |

(Continued)

OTHER PUBLICATIONS

"A Plug and Play Method for Maintenance Support System to Streamline System Configurations at Sensor Connection," CRIEPI Research Report, Aug. 2011, pp. 1-2 and English-language abstract.

*Primary Examiner* — Ryan Johnson
(74) *Attorney, Agent, or Firm* — Nixon & Vanderhye, P.C.

(57) ABSTRACT

According to one embodiment, there is provided a power electronics device including: a connector connected to a power line; a power controller; a connection detection processor; and a collision monitor. The power controller performs at least one of generating an electric signal to the power line and detecting an electric signal on the power line via the connector. The connection detection processor performs a connection detection process with use of the power controller to detect another power electronics device connected to the power line. The collision monitor monitors whether or not collision of electric signals occurs on the power line during the connection detection process and controls the connection detection processor according to a monitoring result of whether or not the collision of electric signals occurs.

12 Claims, 41 Drawing Sheets

(51) Int. Cl.
*H02J 13/00* (2006.01)
*H02J 3/38* (2006.01)
*H02J 3/48* (2006.01)
*H02J 3/50* (2006.01)
*H02J 7/35* (2006.01)

(52) U.S. Cl.
CPC ............ *H02J 3/50* (2013.01); *H02J 13/0062* (2013.01); *H02J 13/0079* (2013.01); *H02J 7/35* (2013.01); *Y02E 10/563* (2013.01); *Y02E 10/566* (2013.01); *Y02E 40/72* (2013.01); *Y02E 60/722* (2013.01); *Y02E 60/7815* (2013.01); *Y02E 60/7838* (2013.01); *Y02E 70/30* (2013.01); *Y04S 10/123* (2013.01); *Y04S 10/14* (2013.01); *Y04S 40/121* (2013.01); *Y04S 40/124* (2013.01); *Y10T 307/258* (2015.04)

(58) Field of Classification Search
CPC .... H02J 3/38; H02J 3/381; H02J 3/382; H02J 3/383; Y02E 40/72; Y02E 60/7815; Y02E 60/7823; G05B 2219/2237; Y04S 10/12; Y04S 20/221; Y04S 40/121; Y04S 40/122; Y10T 307/707; H04B 2203/5462; H04B 3/542; H04B 3/544; H04B 3/54
See application file for complete search history.

(56) References Cited

U.S. PATENT DOCUMENTS

| | | | |
|---|---|---|---|
| 2013/0106196 A1* | 5/2013 | Johnson | H02J 3/1842 307/82 |
| 2014/0288718 A1 | 9/2014 | Nishibayashi et al. | |
| 2017/0149278 A1* | 5/2017 | Chapman | H02J 13/0024 |
| 2017/0155342 A1* | 6/2017 | Deboy | H02M 7/53871 |

FOREIGN PATENT DOCUMENTS

| | | |
|---|---|---|
| JP | 2003-348851 | 12/2003 |
| JP | 2007-174518 | 7/2007 |

* cited by examiner

AUTONOMOUS COOPERATION: POWER SHARING CONTROL
WITHIN ELECTRICAL POWER HANDLING CAPABITY

AUTONOMOUS COOPERATION: SINCHRONIZED OPERATION
OF A PLURALITY OF POWER SOURCE (PHASE
SYNCHRONIZATION CONTROL OF OUTPUT POWER)

| INFORMATION TYPE | REMARKS |
|---|---|
| DEVICE ID | INDIVIDUAL IDENTIFICATION INFORMATION (E.G., SERIAL NUMBER) |
| DEVICE TYPE | EMS, INV (AC/DC), INV (DC/DC), INV (DC/DC): POWER SOURCE (ENERGY STORAGE) INV (DC/DC): POWER SOURCE (PV), INV (DC/DC): LOAD, *DC/DC: POWER SOURCE (TO WHICH POWER SOURCE SUCH AS ENERGY STORAGE AND PV IS CONNECTED) *DC/DC: LOAD (TO WHICH DEVICE TO BE LOAD IS CONNECTED) |
| COMMUNICATION LINE CONNECTION | DEVICES PLACED IN THE SAME COMMUNICATION BROADCAST DOMAIN |
| POWER LINE CONNECTION | DEVICES PLACED ON THE SAME BUS |
| MASTER/SLAVE | MASTER: DEVICE TO BE CONTROL ENTITY SLAVE: DEVICE UNDER CONTROL |

FIG. 7

| DEVICE ID | DEVICE TYPE | COMMUNICATION LINE CONNECTION | POWER LINE CONNECTION | MASTER/ SLAVE |
|---|---|---|---|---|
| 1 | INV (AC/DC) | 2,3,4 | 2,3,4 | M: NULL/ S: 2, 3, 4 |
| 2 | INV (DC/DC): POWER SOURCE (ENERGY STORTAGE) | 1,3,4 | 1,3,4 | M: 1/ NULL |
| 3 | INV (DC/DC): POWER SOURCE (PV) | 1,2,4 | 1,2,4 | M: 1/ NULL |
| 4 | INV (DC/DC): LOAD | 1,2,3 | 1,2,3 | M: 1/ NULL |

FIG. 8

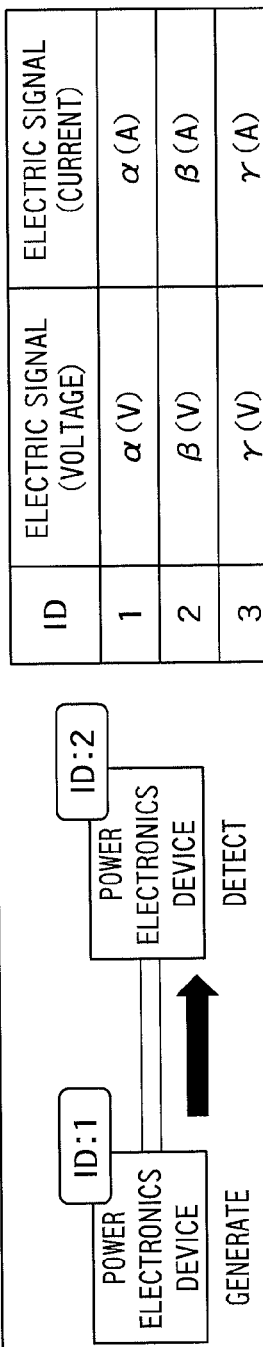
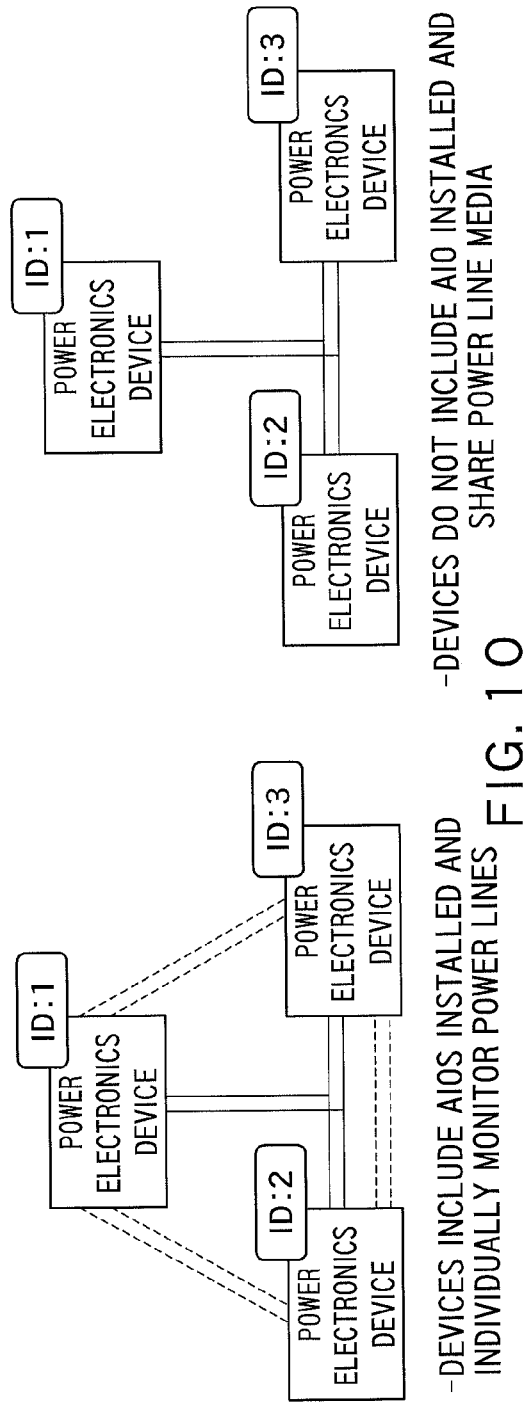
FIG. 10

| PHYSICAL MEDIUM TO BE USED | CONFIRM CONNECTION THROUGH POWER LINE | PRECONDITION | TRANSMISSION TIMING OF ELECTRIC SIGNAL | METHOD OF DETERMINING NOMALITY OF ELECTRIC SIGNAL TRANSMISSION |
|---|---|---|---|---|
| COMMUNICATION LINE | × | — | — | — |
| POWER LINE | ○ | DEVICE ID AND ELECTRIC SIGNALS ARE KNOWN, DEVICE INCLUDING AIO INSTALLED | TRANSMITTED BY THE DEVICE (GENERATE SIGNAL TO POWER LINE) | — |
| | | DEVICE ID AND ELECTRIC SIGNALS ARE KNOWN, DEVICE NOT INCLUDING AIO INSTALLED | TRANSMITTED BY THE DEVICE (GENERATE SIGNAL TO POWER LINE + DETECT SIGNAL ON POWER LINE) | THE DEVICE DETERMINES TRANSMISION NORMALITY IN DETECTING ELECTRIC SIGNAL |
| BOTH POWER LINE AND COMMUNICATION LINE | ○ | DEVICE ID AND ELECTRIC SIGNALS ARE KNOWN, DEVICE INCLUDING/NOT INCLUDING AIO INSTALLED | TRANSMITTED BY THE DEVICE (GENERATE SIGNAL TO POWER LINE + DETECT SIGNAL ON COMMUNICATION LINE) | THE DEVICE DETERMINES TRANSMISSION NORMALITY IN DETECTING COMMUNICATION SIGNALS |
| | | DEVICE ID AND ELECTRIC SIGNAL ARE UNKNOWN, DEVICE INCLUDING/NOT INCLUDING AIO INSTALLED | TRANSMITTED BY THE DEVICE (GENERATE SIGNAL TO COMMUNICATION LINE + GENERATE SIGNAL TO POWER LINE + DETECT SIGNAL ON COMMUNICATION LINE) | THE DEVICE DETERMINES TRANSMISSION NORMALITY IN DETECTING COMMUNICATION SIGNALS |
| | | | LISTEN TO OTHER PARTY'S DEVICE (GENERATE SIGNAL TO COMMUNICATION LINE + DETECT SIGNAL ON POWER LINE) | THE DEVICE DETERMINES TRANSMISSION NORMALITY IN DETECTING ELECTRIC SIGNALS |

FIG. 11

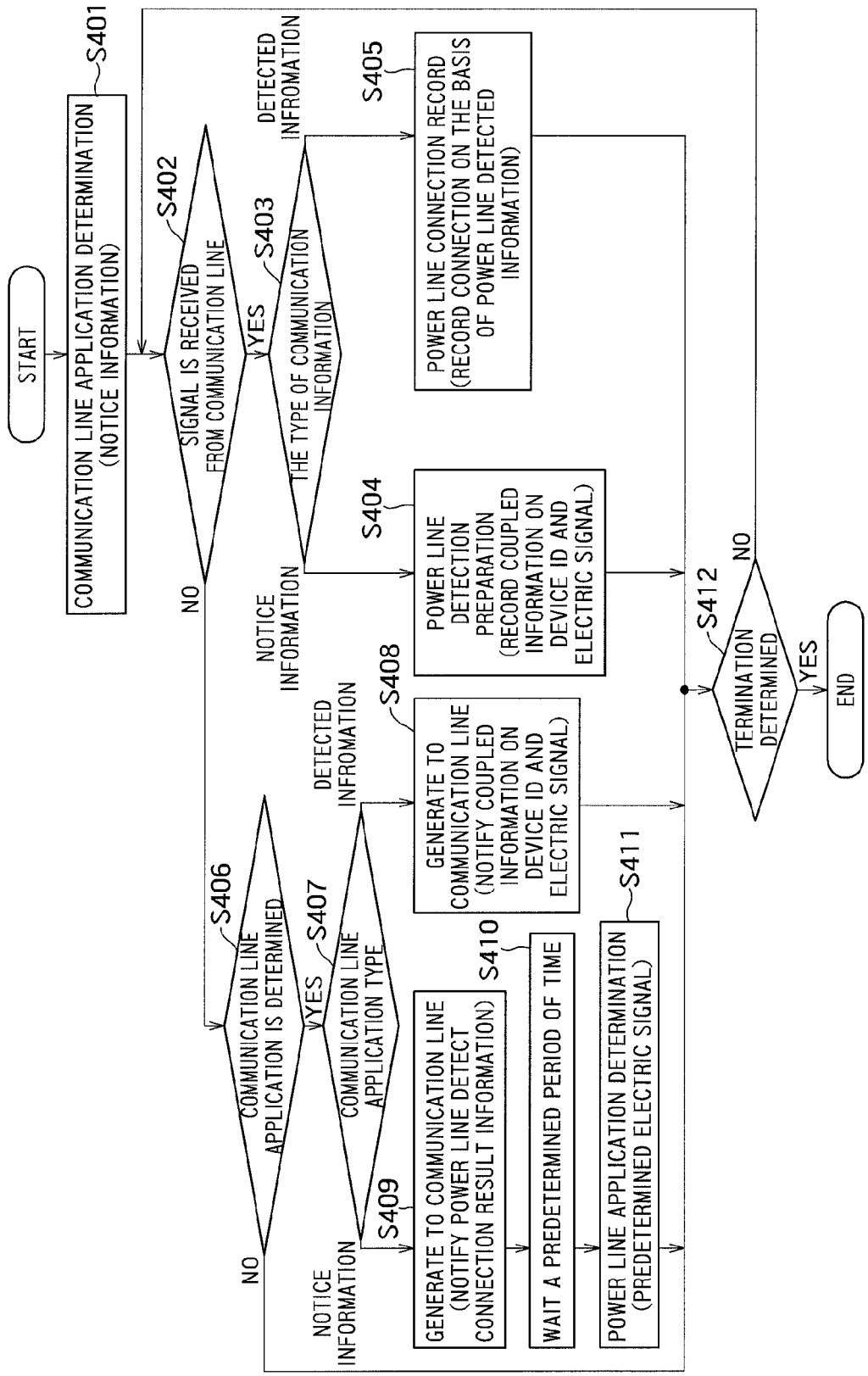
F I G. 13B

(A)

| VIEWPOINT OF DEVICE ID:4 ||
| ID | MASTER/SLAVE |
| --- | --- |
| 1 | |
| 2 | |
| 3 | |
| 4 | |

(B)

| VIEWPOINT OF DEVICE ID:4 ||
| ID | MASTER/SLAVE |
| --- | --- |
| 1 | |
| 2 | |
| 3 | S:4 |
| 4 | M:3 |

(C)

| VIEWPOINT OF DEVICE ID:4 ||
| ID | MASTER/SLAVE |
| --- | --- |
| 1 | |
| 2 | M:3 |
| 3 | S:2,4 |
| 4 | M:3 |

(D)

| VIEWPOINT OF DEVICE ID:4 ||
| ID | MASTER/SLAVE |
| --- | --- |
| 1 | S:3,4 |
| 2 | M:3 |
| 3 | M:1 S:2 |
| 4 | M:1 |

(E)

| VIEWPOINT OF DEVICE ID:4 ||
| ID | MASTER/SLAVE |
| --- | --- |
| 1 | S:2,3,4 |
| 2 | M:1 |
| 3 | M:1 |
| 4 | M:1 |

| ID | VIEWPOINT OF DEVICE ID:4 MASTER/SLAVE |
|---|---|
| 1 |  |
| 2 |  |
| 3 |  |
| 4 |  |

(B)

| ID | VIEWPOINT OF DEVICE ID:4 MASTER/SLAVE |
|---|---|
| 1 |  |
| 2 |  |
| 3 | S:4 |
| 4 | M:3 |

(C)

| ID | VIEWPOINT OF DEVICE ID:4 MASTER/SLAVE |
|---|---|
| 1 |  |
| 2 | M:3 |
| 3 | S:2,4 |
| 4 | M:3 |

(D)

| ID | VIEWPOINT OF DEVICE ID:4 MASTER/SLAVE |
|---|---|
| 1 | S:4 |
| 2 | M:3 |
| 3 | S:2,4 |
| 4 | M:1 |

(E)

| ID | VIEWPOINT OF DEVICE ID:4 MASTER/SLAVE |
|---|---|
| 1 | S:2,4 |
| 2 | M:1 |
| 3 | S:2,4 |
| 4 | M:1 |

(F)

| ID | VIEWPOINT OF DEVICE ID:4 MASTER/SLAVE |
|---|---|
| 1 | S:2,3,4 |
| 2 | M:1 |
| 3 | M:1 |
| 4 | M:1 |

FIG. 22C

[STEP 1 : REGULAR OPERATION (NORMAL OPERATION)]

|  | AC/DC (M) | DC/DC (ENERGY STORAGE) (S) | DC/DC (PV) (S) | DC/DC (LOAD) (S) |
|---|---|---|---|---|
| RATED VALUE | 25kW | 10kW | 10kW | 25kW |
| ACTUAL VALUE | 25kW | 0 | 0 | 25kW |

[STEP 2 : BLACKOUT OCCURS (OCCURRENCE OF ABNORMALITY)]

|  | AC/DC (M) | DC/DC (ENERGY STORAGE) (S) | DC/DC (PV) (S) | DC/DC (LOAD) (S) |
|---|---|---|---|---|
| RATED VALUE | – | 10kW | 10kW | – |
| ACTUAL VALUE | – | 0 | 0 | – |

[STEP 3 : FAIL-SOFT (FALLBACK)]

|  | AC/DC | DC/DC (ENERGY STORAGE) (M) | DC/DC (PV) (S) | DC/DC (LOAD) (S) |
|---|---|---|---|---|
| RATED VALUE | – | 10kW | 10kW | 25kW |
| ACTUAL VALUE | – | 10kW | 10kW | 20kW |

[STEP 4 : BLACKOUT END (RECOVER FROM ABNORMALITY)→TO STEP 1)]

|  | AC/DC | DC/DC (ENERGY STORAGE) (M) | DC/DC (PV) (S) | DC/DC (LOAD) (S) |
|---|---|---|---|---|
| RATED VALUE | 25kW | 10kW | 10kW | 25kW |
| ACTUAL VALUE | 0 | 10kW | 10kW | 20kW |

FIG. 24C

COMMUNICATION MESSAGE REGARDING ADVERTISEMENT

| COMMUNICATION HEADER | MESSAGE TYPE | TRANSMISSION DEVICE ID | NOTIFYCATION/ UPDATE/ SEPARATION |
|---|---|---|---|

FIG. 25

COMMUNICATION MESSAGE REGARDING SEARCH REQUEST

| COMMUNICATION HEADER | MESSAGE TYPE | TRANSMISSION DEVICE ID | WAITING TIME |
|---|---|---|---|

FIG. 26

COMMUNICATION MESSAGE REGARDING SEARCH RESPONSE

| COMMUNICATION HEADER | MESSAGE TYPE | TRANSMISSION DEVICE ID |
|---|---|---|

FIG. 27

COMMUNICATION MESSAGE REGARDING CONFIGURATION INFORMATION
WRITING RESPONSE

| COMMUNICATION HEADER | MESSAGE TYPE | TRANSMISSION DEVICE ID | SEQUENCE NUMBER | WRITING RESULT |
|---|---|---|---|---|

FIG. 29

COMMUNICATION MESSAGE REGARDING CONFIGURATION INFORMATION READING REQUEST

| COMMUNICATION HEADER | MESSAGE TYPE | TRANSMISSION DEVICE ID | SEQUENCE NUMBER |
|---|---|---|---|

FIG. 30

COMMUNICATION MESSAGE REGARDING CONFIGURATION INFORMATION READING RESPONSE

| COMMUNICATION HEADER | MESSAGE TYPE | TRANSMISSION DEVICE ID | SEQUENCE NUMBER | THE NUMBER OF PIECES OF CONFIGURATION INFORMATION | CONFIGURATION INFORMATION 1 | CONFIGURATION INFORMATION 2 | CONFIGURATION INFORMATION 3 | ... | CONFIGURATION INFORMATION n |

COMMUNICATION MESSAGE REGARDING CONNECTION ACKNOWLEDGEMENT REQUEST

| COMMUNICATION HEADER | MESSAGE TYPE | TRANSMISSION DEVICE ID | RECEPTION DEVICE ID | ELECTRIC SIGNAL | PREDETERMINED PERIOD OF TIME |

FIG. 33

COMMUNICATION MESSAGE REGARDING CONNECTION ACKNOWLEDGEMENT RESPONSE

| COMMUNICATION HEADER | MESSAGE TYPE | TRANSMISSION DEVICE ID | ELECTRIC SIGNAL |
|---|---|---|---|

POWER ELECTRONICS DEVICE, DEVICE DETECTION METHOD, AND PROGRAM

CROSS-REFERENCE TO RELATED APPLICATIONS

This application is based upon and claims the benefit of priority from Japanese Patent Application No. 2013-196135, filed Sep. 20, 2013; the entire contents of which are incorporated herein by reference.

FIELD

The embodiment described herein relates to a power electronics device, a device detection method, and a program.

BACKGROUND

Assume a system in which inverter units (power electronics devices) each have a communicating function, and automatic capacity change is performed in the cases including the extension of the system and the occurrence of abnormality while securing the flexibility of an operation, by employing an autonomous cooperative control such as a phase synchronization control of output power and power sharing control among a plurality of power electronics devices.

For example, for the purpose of increasing the output of power by causing a plurality of power electronics devices to operate in parallel, it is conceivable to have a function called phase synchronization control of output power. The function of phase synchronization control of output power is to prevent the occurrence of a cross current in an AC-side output (a reactive cross current flowing due to the difference in electromotive force, a synchronization cross current flowing due to the difference in phase difference of electromotive force, and a harmonic cross current flowing due to the difference in waveform of electromotive force). In this case, it is useful for increasing the throughput of power input/output that the plurality of power electronics devices determine an entity of control right, that is, a master (a device being a control entity)/a slave (a device being a controlled entity), and the master instructs the slave on power information for the phase synchronization control of output power or synchronization information (time synchronization information, frequency information). In the case where three or more power electronics devices are connected to the same power line, the actual values of individual devices with respect to the planned values thereof are hard to be recognized with only information from the power line, so the slave is synchronized with the master by exchanging power information using a communication control.

There has been disclosed a method in which a plurality of inverters each having a role of master/slave set in a fixed manner implement a parallel operation equivalent to the phase synchronization control of output power, by using synchronization through an optical communication line. In addition, there has been disclosed a method in which a device notifies apparatus information to a server through communication when connected to a system so as to dynamically set software of a server that performs a monitoring control to the device.

However, in the case where a plurality of power electronics device dynamically determine the roles of master/slave, since the devices separately operate in initial installation or in the occurrence of abnormality, the operation may be started in the state where a plurality of masters exist in the system if an established state of a logical configuration to control the power is not taken into consideration. In this case, it is difficult to centrally determine which power electronics device from which synchronization information is received to operate, so a function of the phase synchronization control of output power does not properly performed, which is problematic. These problem have not been able to be solved only by a simple combination of the conventional art (the roles of master/slave are fixed, the server centrally collects information to secure centralization of the information).

Furthermore, since the all conventional methods are assumed that the operating states range from in initial installation of the device to in operation, it is difficult to secure the flexibility of the operation and to maintain the throughput of power input/output by automatically performing fail-soft (fallback) to continue the power input/output in the event where an abnormality such as blackout (massive blackout) occurs, which is problematic.

As described above, the conventional arts have not disclosed a method of increasing the throughput of power input/output while securing the flexibility of an operation, in which a plurality of devices automatically change a logical configuration in operation scenes including the initial installation of the power electronics devices or the occurrence of abnormality after starting the operation.

BRIEF DESCRIPTION OF THE DRAWINGS

FIG. 7 is a diagram showing a configuration example of characteristics information according to the embodiment of the present invention;

FIG. 8 is a diagram showing a configuration example of configuration information according to the embodiment of the present invention;

FIG. 10 is a diagram illustrating the dynamic grasping of power line connections according to the embodiment of the present invention;

FIG. 11 is a diagram illustrating the dynamic grasping of power line connections according to the embodiment of the present invention;

FIG. 13B is a diagram illustrating the dynamic grasping of power line connections according to the embodiment of the present invention;

FIG. 21C is a diagram showing how master/slave information in configuration information on a power electronics device according to the embodiment of the present invention is updated;

FIG. 22C is a diagram showing how master/slave information in configuration information on a power electronics device according to the embodiment of the present invention is updated;

FIG. 24C is a diagram showing the example of how to determine the configuration of the plurality of power electronics devices according to the embodiment of the present invention, in the occurrence of abnormality;

FIG. 25 is a diagram showing a configuration example of the communication message according to the embodiment of the present invention;

FIG. 26 is a diagram showing a configuration example of the communication message according to the embodiment of the present invention;

FIG. 27 is a diagram showing a configuration example of the communication message according to the embodiment of the present invention;

FIG. 29 is a diagram showing a configuration example of the communication message according to the embodiment of the present invention;

FIG. 30 is a diagram showing a configuration example of the communication message according to the embodiment of the present invention;

FIG. 31 is a diagram showing a configuration example of the communication message according to the embodiment of the present invention;

FIG. 32 is a diagram showing a configuration example of the communication message according to the embodiment of the present invention; and FIG. 33 is a diagram showing a configuration example of the communication message according to the embodiment of the present invention.

DETAILED DESCRIPTION

According to one embodiment, there is provided a power electronics device including: a connector connected to a power line; a power controller; a connection detection processor; and a collision monitor.

The power controller performs at least one of generating an electric signal to the power line and detecting an electric signal on the power line via the connector.

The connection detection processor performs a connection detection process with use of the power controller to detect another power electronics device connected to the power line.

The collision monitor monitors whether or not collision of electric signals occurs on the power line during the connection detection process and controls the connection detection processor according to a monitoring result of whether or not the collision of electric signals occurs.

The embodiments will be described below with reference to the drawings.

Figure 1:
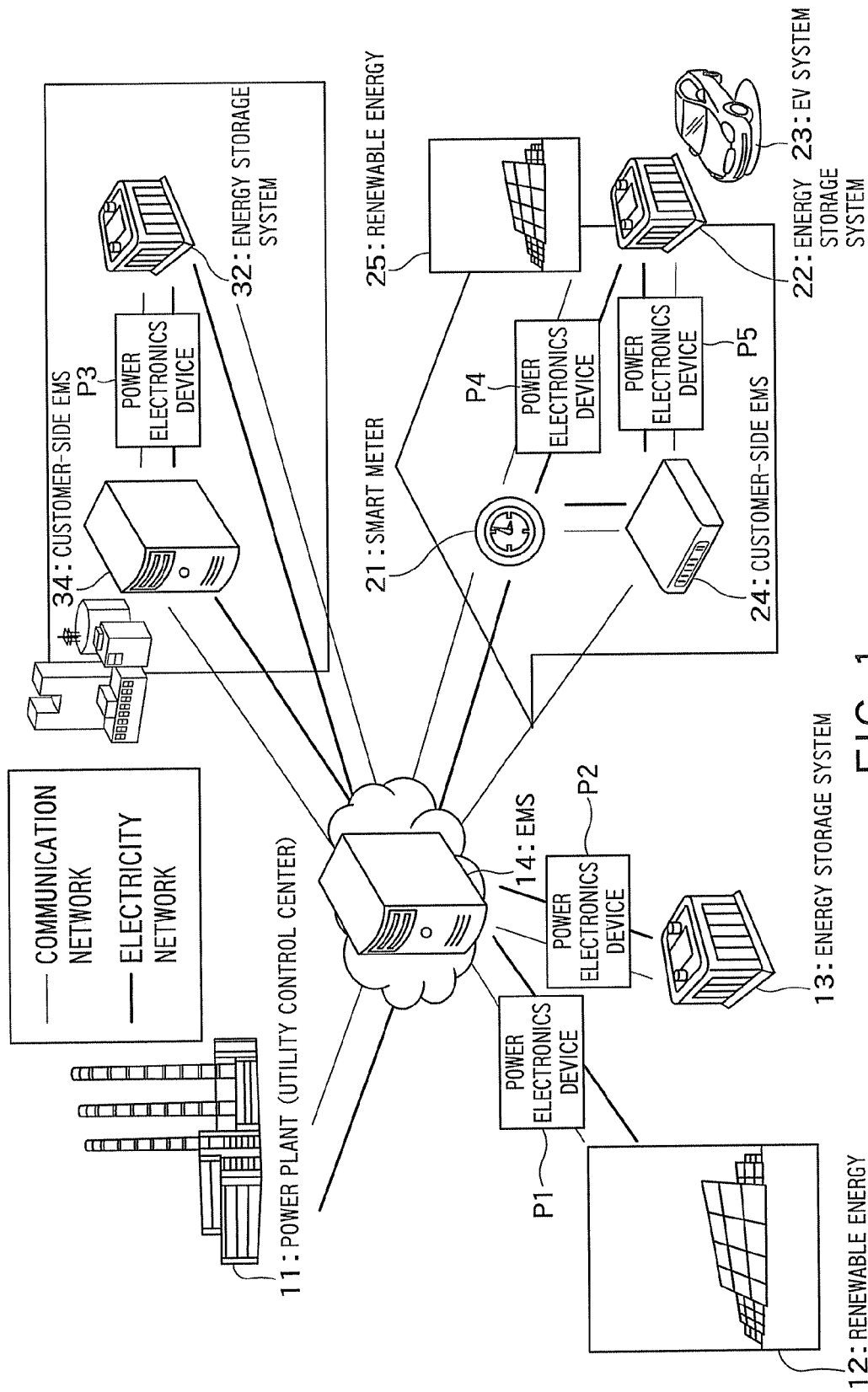
FIG. 1 is a configuration diagram of the entire system according to an embodiment of the present invention.

The entire outline of a system configuration in the present invention is shown in FIG. 1. On a power infrastructure side, a power plant (utility control center) 11, a renewable energy system 12, an energy storage system 13, an EMS (Energy Management System) 14 are installed. On a customer side including a house and a building, a smart meter 21, energy storage systems 22 and 32, an EV (Electric Vehicle) system 23, customer-side EMSs 24 and 34, and the like are installed. In addition, a renewable energy system 25 such as a photovoltaic generation (PV) system and a wind power generation system is installed. The customer-side EMS for house is called an HEMS (Home Energy Management System) and the customer-side EMS for building is called a BEMS (Building Energy Management System), each of which performs a power monitoring control on the premises. The renewable energy systems 12 and 25, and the energy storage systems 13, 22, and 32 are connected to inverters (power electronics devices) P1, P4, P2, P5, and P3 that perform the conversion of input/output power (DC/AC or DC/DC).

The power plant (utility control center) 11 generates bulk power from a fuel source such as a thermal power and a nuclear power, and supplies the power to the customer side including houses, buildings, and factories, through a power distribution network. In the embodiment of the present invention, the power distribution network including from the power plant 11 to the customers is collectively called an electricity infrastructure (power system network). The renewable energy system 12 includes a generator that generates power from energy existing in the natural world such as wind power and sunlight, and supplies the power from the power system network to the customers through the power distribution network, like the power plant. Installing the renewable energy systems in the power system network allows the power plant to have reduced loads and to operate efficiently. Among them, the energy storage system 13 serves to store surplus power generated by the power plant 11 or the renewable energy system 12. The EMS 14 serves to control stabilization of the entire power system including such supplied power from the power plant 11 and the renewable energy system 12, and the load power that is consumed on the customer side, with utilizing both an electricity network and a communication network.

The smart meter 21 measures electric energy consumed on the premises on the customer side, and periodically provides the notification to a management server in an electric power provider. The management server is typically called an MDMS (Metering Data Management System), of which illustration is omitted in FIG. 1. The above-described EMS 14 can cooperate with the MDMS to calculate the total amount of the load power on the customer side. The energy storage systems 32 and 22 installed on the customer's premises store the power supplied through a system network of the electric power provider, or the power generated by the renewable energy system on the premises. The EV system 23 stores the power in an onboard battery via a charger. The HEMS performs a monitoring control to the amount of power consumption in a house, and the BEMS performs a monitoring control to the amount of power consumption in a building or a factory. The embodiment of the present invention can be practiced not only in houses, but also in buildings or factories similarly as described above. In this case, a customer-side EMS called BEMS on the building's premises, or a customer-side EMS called FEMS (Factory Energy Management System) on the factory's premises serves to monitor and control the amount of power consumption.

The energy storage system on the system-side of the electric power provider is used for implementing a function called an ancillary service (Micro Load Frequency Control), in which output adjustment is performed on a second-by-second basis in accordance with the instantaneous variations of loads in order to maintain the qualities of power such as frequencies and voltages of the system, which in turn stabilizes the system. In addition, the energy storage system on the customer side including the houses and the buildings may be used for implementing a function called peak shaving (all-day operation), in which nighttime power, of which unit price is inexpensive, is stored and flexibly used in a time period when daytime power uses are concentrated. The power electronics devices P1 to P5 perform the conversion of power between the DC power that the energy storage system or the renewable energy system inputs/outputs and the AC power through the power system network.

Figure 2:
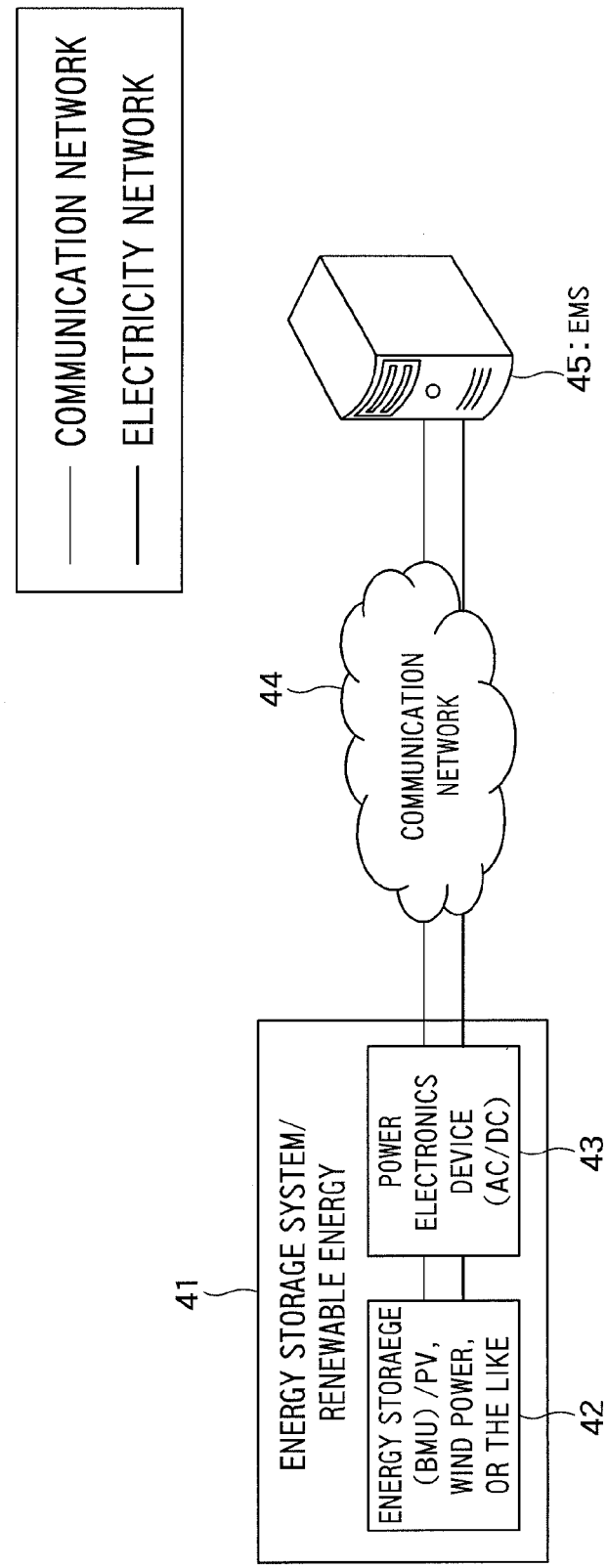
FIG. 2 is a configuration diagram of an energy storage system/renewable energy system according to the embodiment of the present invention.
Figure 3:
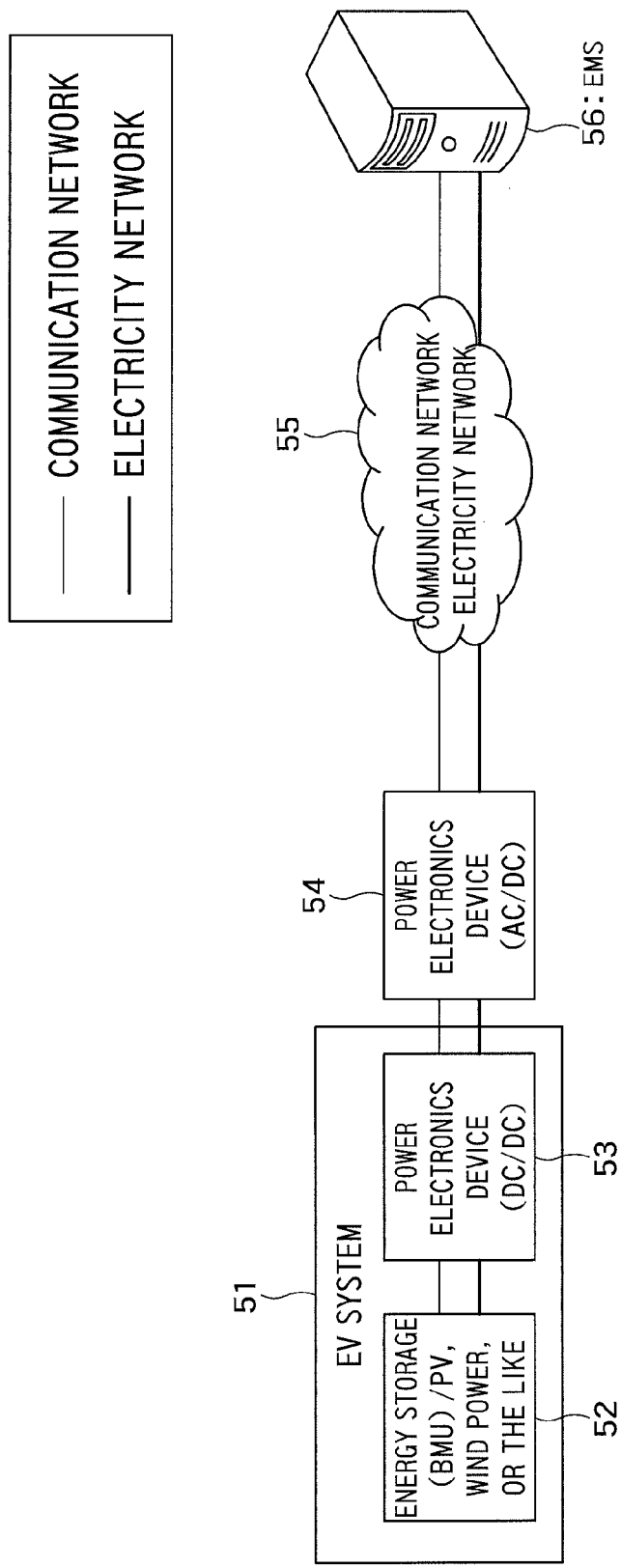
FIG. 3 is a configuration diagram of an EV system according to the embodiment of the present invention.

FIG. 2 and FIG. 3 show basic system configurations of the power electronics devices of the present invention according to the embodiment shown in FIG. 1. They each show the system configuration of FIG. 1 in detail. FIG. 2 presents the configuration of the energy storage system and the renewable energy system in detail, and FIG. 3 presents the configuration of the EV system in detail. The energy storage in the energy storage system performs both charging and discharging, and the renewable energy generator such as a wind power generator and a photovoltaic generator (configured by replacing the energy storage of FIG. 2) performs only discharging.

The energy storage system/renewable energy system of FIG. 2 is connected to an EMS 45 via the communication network and the electricity network 44. The EMS 45 may be the EMS on the system-side or the EMS on the customer side. The energy storage system/renewable energy system is configured by an energy storage (BMU: Battery Management Unit) 42 or a generator, and a power electronics device 43. The power electronics device 43 is called an inverter, a converter, or a PCS (Power Conditioning System), which serves to convert the input/output of the power or adjust a voltage.

The energy storage (BMU) 42 includes a plurality of battery cells, as well as an internal processor that manages the internal state of a battery pack, and performs a charging/discharging control to the power on the basis of requests from the power electronics device 43. The energy storage (BMU) 42 notifies, to a controller, information such as a rated voltage, a maximum current value in charging/discharging, a State Of Charge (SOC), and a State Of Health (SOH).

In the example of FIG. 2, the power electronics device 43 exchanges DC power with the energy storage 42, and exchanges AC power with the power system network 44. The power electronics device 43 performs the DC/AC conversion or the suppression of voltage fluctuation, but it is conceivable that the functions thereof are implemented by a processor connected to the outside of the device.

In addition, to implement the charging/discharging control and information notification between the energy storage (BMU) 42 and the power electronics device 43, there are possible forms such as using CAN (Controller Area Network), or using a wired communication medium including the Ethernet, a wireless communication medium including a wireless LAN (Local Area Network), or an electric signal line originally defined by a vendor selling the products, but the embodiment of the present invention is not limited to any one of the communications.

The power electronics device 43 in the energy storage system of FIG. 2 has a communicating function and communicates with the EMS 45, which has a variety of kinds, installed in the power system network or on the customer's premises. Since the energy storage typically has the characteristics of self-discharge, the EMS 45 appropriately obtains information such as SOC and SOH from the energy storage system to monitor the state changing every moment, and can thereby provide the instructions of the charging/discharging control.

Note that the power input/output via the power electronics device may be referred to as charging/discharging. In addition, since the power electronics device basically performs only the power output in the case where the renewable energy generator such as a wind power generator and a photovoltaic generator is used instead of the energy storage (BMU) 42, the power output via the power electronics device in the use of this case may be referred to as discharging. In the power system built with the plurality of power electronics devices, the power electronics devices serve to switch a flow rate of the power input/output, which will be described in detail with reference to FIG. 4.

The EV system of FIG. 3 has a configuration similar to that of the energy storage system/renewable energy generator of FIG. 2, but differs in that the EV system includes, besides a first power electronics device 53 that is connected to an energy storage 52 to operate, a second power electronics device 54 that operates as a charger. An EV system 51 is connected to an EMS 56 via a communication network and an electricity network 55.

The first power electronics device 53 connected to the energy storage 52 in the EV system 51 of FIG. 3 relays the power and communication information between the energy storage (BMU) 52 and the second power electronics device (charger) 54. In this case, the first power electronics device 53 does not necessarily have a communication capacity to communicate with the EMS 56, which has a variety of kinds, in the power system network or on the customer's premises. That is, the difference arising in the example of FIG. 3 is in that the function of AC/DC conversion in the power electronics device in the energy storage system of FIG. 2 is shifted to the charger side being the second power electronics device 54. In the configuration of FIG. 3, the first power electronics device 53 performs the DC/DC conversion, and the second power electronics device 54 performs the DC/AC conversion.

However, a specific procedure to implement the embodiment of the present invention is common to both FIG. 2 and FIG. 3, and in addition, the function of the EV system can be defined as the same function as the energy storage system. Furthermore, an algorithm controls relating to the charging/discharging to the energy storage (BMU) 52 takes a plurality of forms including one in which they are collected in the first power electronics device 53, one in which they are collected in the second power electronics device (charger) 54, and one in which they are collected in the HEMS/BEMS on the customer's premises and in the EMS in the power system, any one of which can be used to implement the embodiment of the present invention in the similar scheme.

Figure 4:
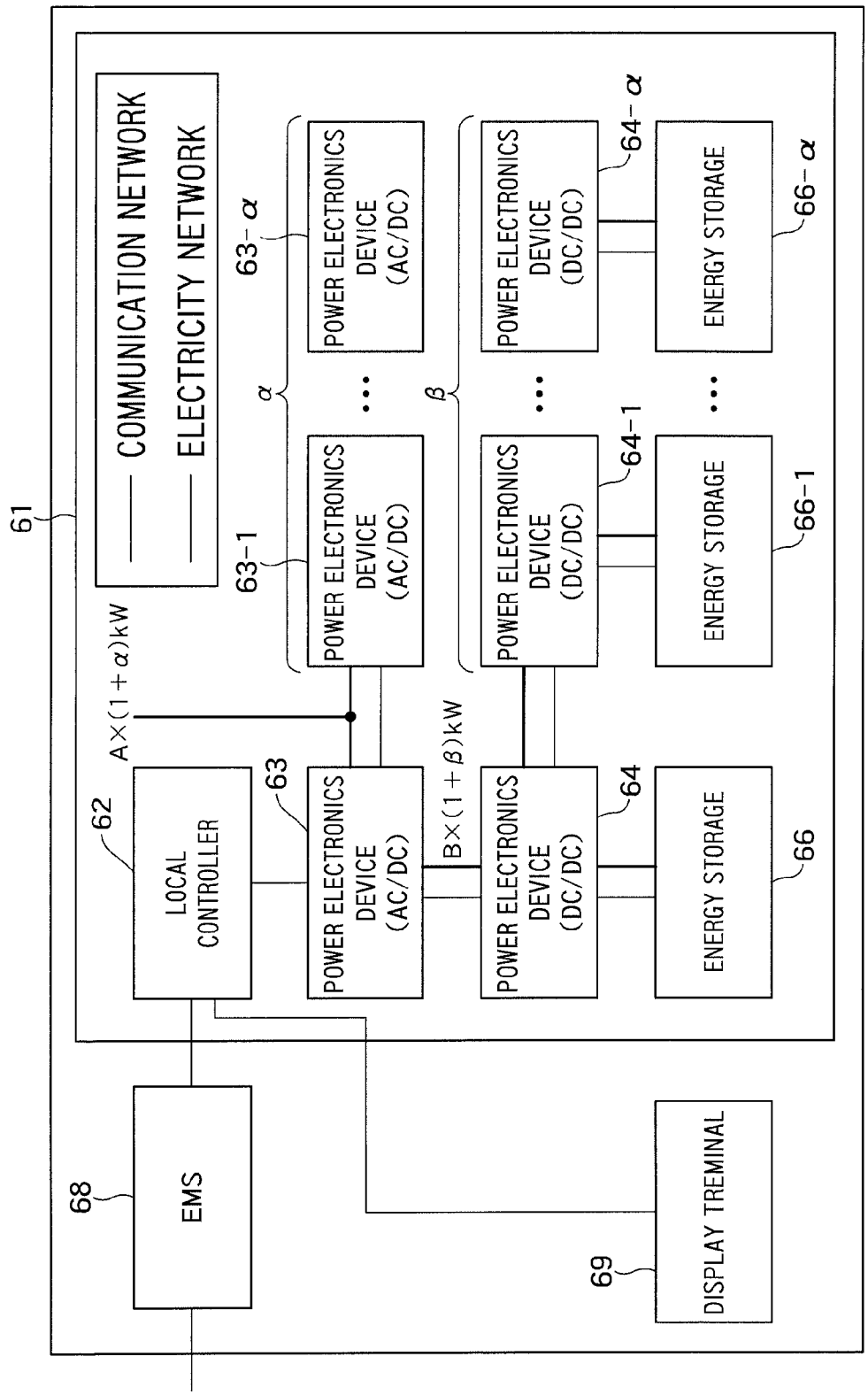
FIG. 4 is a configuration diagram of a system constituted by a plurality of power electronics devices according to the embodiment of the present invention.

In addition to the examples of FIG. 2 and FIG. 3, the power electronics device according to the embodiment of the present invention can be applied to a configuration, as shown in FIG. 4, in which a plurality of power electronics devices are combined. For example, in the case where the plurality of energy storages (and/or the renewable energy generators) are combined to form a logical aggregate of power units, the aggregate includes one or more local controllers, the power electronics devices (AC/DC or DC/DC), and the energy storages (and/or the generators). In the shown example, a power system 61 to be the aggregate includes a local controller 62, power electronics devices (AC/DC or DC/DC) 70, 63, 63-1 to 63-α, 64, 64-1 to 64-β, and energy storages 66, 66-1 to 66-β.

In this case, a configuration between an EMS 68 on the outside and the local controller 62 (the local controller itself can be omitted) is equivalent to the example of FIG. 2 or FIG. 3, with which a power application, for example, for controlling a active power/reactive power can be implemented. In addition to this, when a plurality of power electronics devices coordinate with one another, causing the plurality of power electronics devices to operate in parallel allows for achieving the increase of the power output.

In the example of FIG. 4, assuming that a rated input/output power of the individual power electronics devices (AC/DC) connected to the AC side is A kW, the parallel operation of the number 1+α of the power electronics devices increases the power thereof to A×(1+α) kW, which allows for implementing an power application function called phase synchronization control of output power.

The phase synchronization control of output power can be implemented by preventing the occurrence of a cross current in the AC-side output (a reactive cross current flowing due to the difference in electromotive force, a synchronization cross current flowing due to the difference in phase of electromotive force, and a harmonic cross current flowing due to the difference in waveform of electromotive force), which however involves a problem in which the power electronics devices operating in parallel cannot be in correct synchronization with one another if the determination of a control entity (master/slave determination) to distinguish a device for synchronizing the parallel operation is not performed.

Specifically, for example, in the case of connecting to high power signals like those of the power system network, the power electronics device is not particularly needed to exchange information for synchronization via the communication network, but is gradually synchronized with the signals of the electricity network in terms of the properties of the power. However, in the case where the power is not supplied from the power system network and the plurality of power electronics devices having the same degree of magnitude of the input/output electric energy start to operate at the same time, like in the event of blackout, the power input/outputs intended by users of the power electronics devices cannot be performed if information on which to synchronize with is not exchanged through the communication network, which is problematic.

When three or more power electronics devices are connected, the actual values of the individual devices with respect to the planned values thereof are hard to be recognized with only information from the power line, so the power electronics devices must be synchronized with a master using information from the communication line. On the other hand, power electronics devices (DC/DC) connected to a DC side inputs/outputs the DC power, so the power electronics devices are never synchronized unlike the phase synchronization control of output power. In the case of increasing the power by a plurality of power electronics devices, or in the case of implementing a power application function including a power sharing control, however, a control entity is determined (master/slave determination) and the amounts of allocation are thereafter selected (e.g., selecting energy storages to charge/discharge) like the phase synchronization control of output power. Note that connecting a display terminal 69 to the power electronics devices or the local controller through the communication network allows for implementing a power application of data monitoring, abnormality notification, and parameter adjustment.

Note that, as described above, a scheme is typically used on the power system network side, in which the individual energy storages support a function called an ancillary service in order to handle instantaneous load variations. In this case, since a large power storage capacity comparable to those of power plants needs to be secured, it is useful to utilize the aggregate of the energy storages/renewable energy generators connected to the power electronics devices, as shown in FIG. 4.

On the customer side, a scheme called peak shaving is typically used in which nighttime power, of which unit price is inexpensive, is stored and flexibly used in a time period when daytime power uses are concentrated. An application is also useful in which the electric power provider uses the power from the energy storages or the renewable energy generators installed on the customer side, under the condition that certain incentives are given to the customer side.

Since a plurality of control entities and a plurality of controlled entities can exist depending on such a variety of utilization forms, it is necessary to avoid a conflict over a monitoring control by applying a procedure for determining master/slaves.

FIG. 5A, FIG. 5B, FIG. 5C, and FIG. 5D present four different power application functions focusing on utilizing a plurality of power electronics devices in the embodiment of the present invention.

Figure 5A:
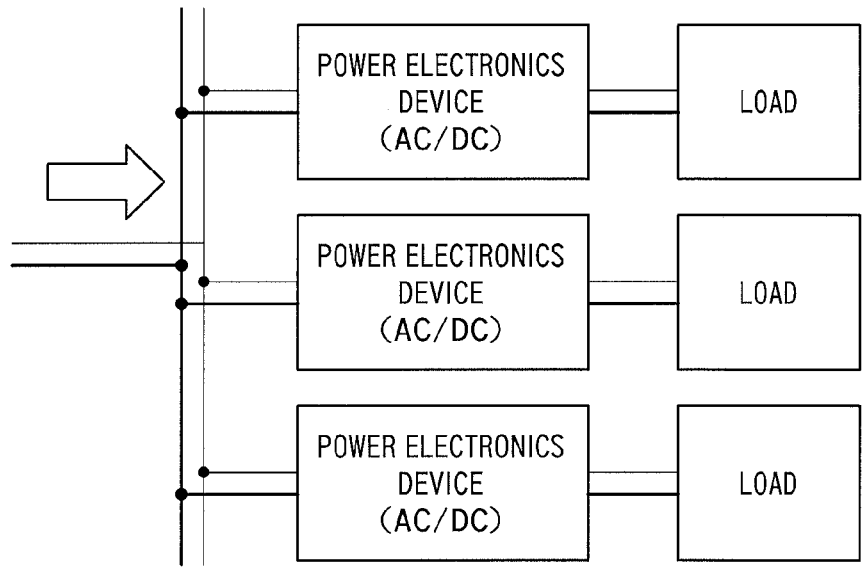
FIG. 5A is a configuration diagram of a system constituted by a plurality of power electronics devices according to the embodiment of the present invention.
Figure 5B:
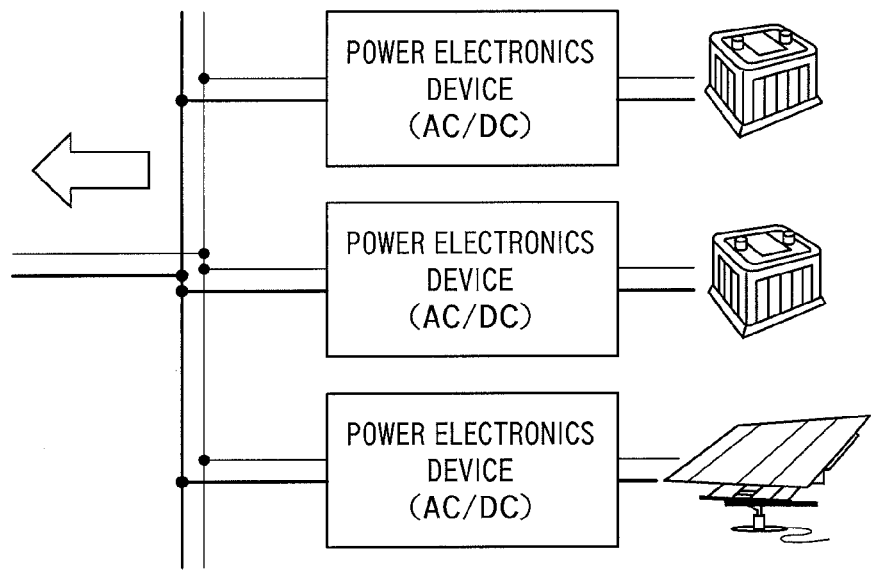
FIG. 5B is a configuration diagram of a system constituted by a plurality of power electronics devices according to the embodiment of the present invention.
Figure 5C:
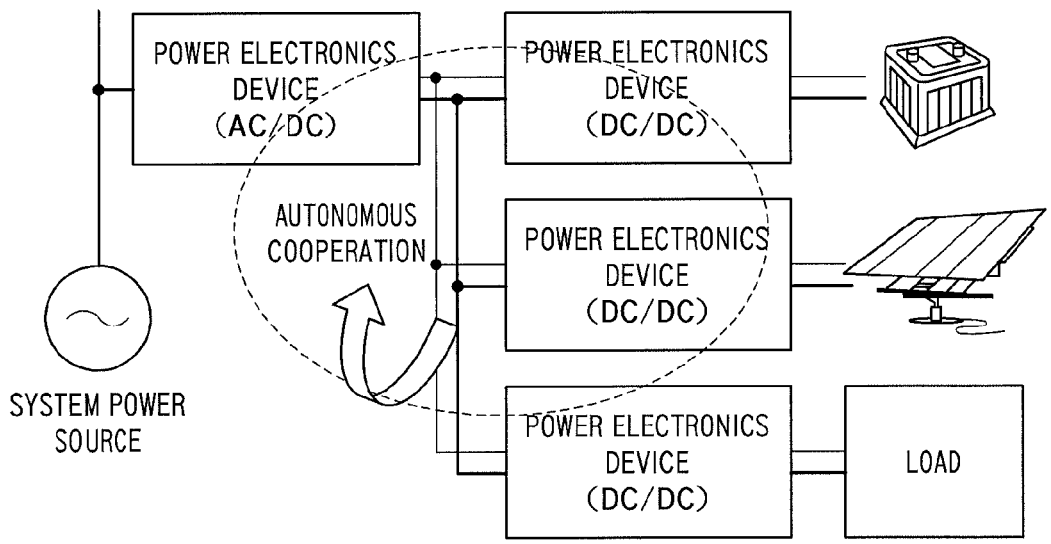
FIG. 5C is a configuration diagram of a system constituted by a plurality of power electronics devices according to the embodiment of the present invention.
Figure 5D:
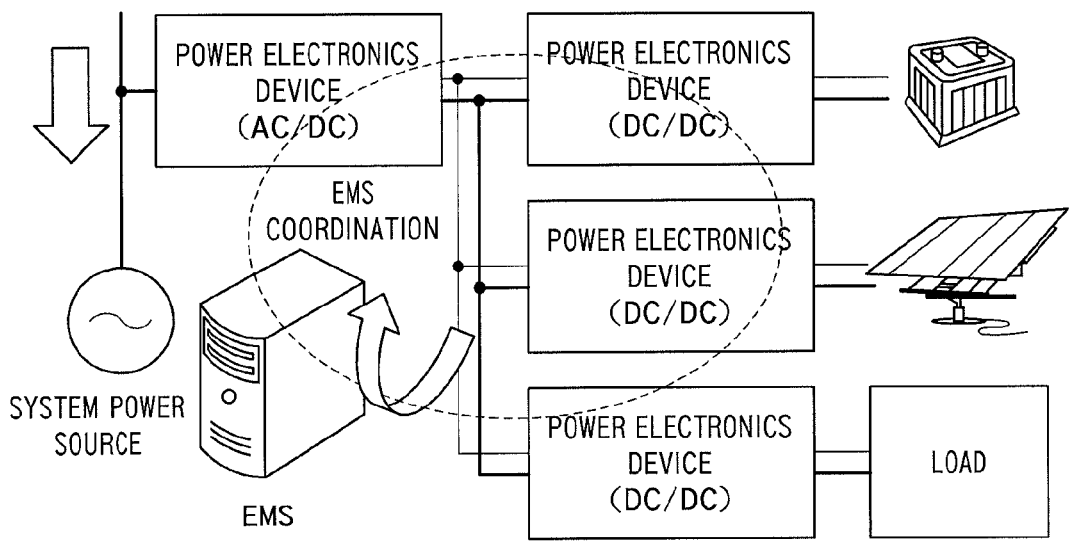
FIG. 5D is a configuration diagram of a system constituted by a plurality of power electronics devices according to the embodiment of the present invention.

FIG. 5A shows "autonomous cooperation: a power sharing control within an electrical power handling capability," FIG. 5B shows "autonomous cooperation: a synchronized operation of a plurality of power sources (phase synchronization control of output power)," FIG. 5C shows "autonomous cooperation: starting from blackout," and FIG. 5D shows "EMS coordination: a monitoring control of active power/reactive power." These are reorganization of the configuration diagram in FIG. 4 from a viewpoint of the application function and from a view point of installation configuration.

The power sharing control of inputting shown in FIG. 5A is applied to the case where a plurality of power electronics devices (AC/DC) each having a connection to the AC side and each connected to a load input power. The phase synchronization control of output power shown in FIG. 5B is applied to the case where a plurality of power electronics devices (AC/DC) connected to power sources output power. In addition, as presented in FIG. 4, the power sharing control of outputting is applied to the case where a plurality of power electronics devices (DC/DC) each having a connection only to the DC side and each connected to a power source output power.

On the other hand, a configuration is conceivable in which a plurality of power electronics devices are connected in a hierarchical manner. There is a case where power electronics devices exchanges information with one another without using an EMS, or where a monitoring control of a centralized control is performed using an EMS, as shown in FIG. 5D. In the embodiment of the present invention, the configuration without using an EMS shown in FIG. 5C is defined as an autonomous cooperation monitoring control.

Figure 6:
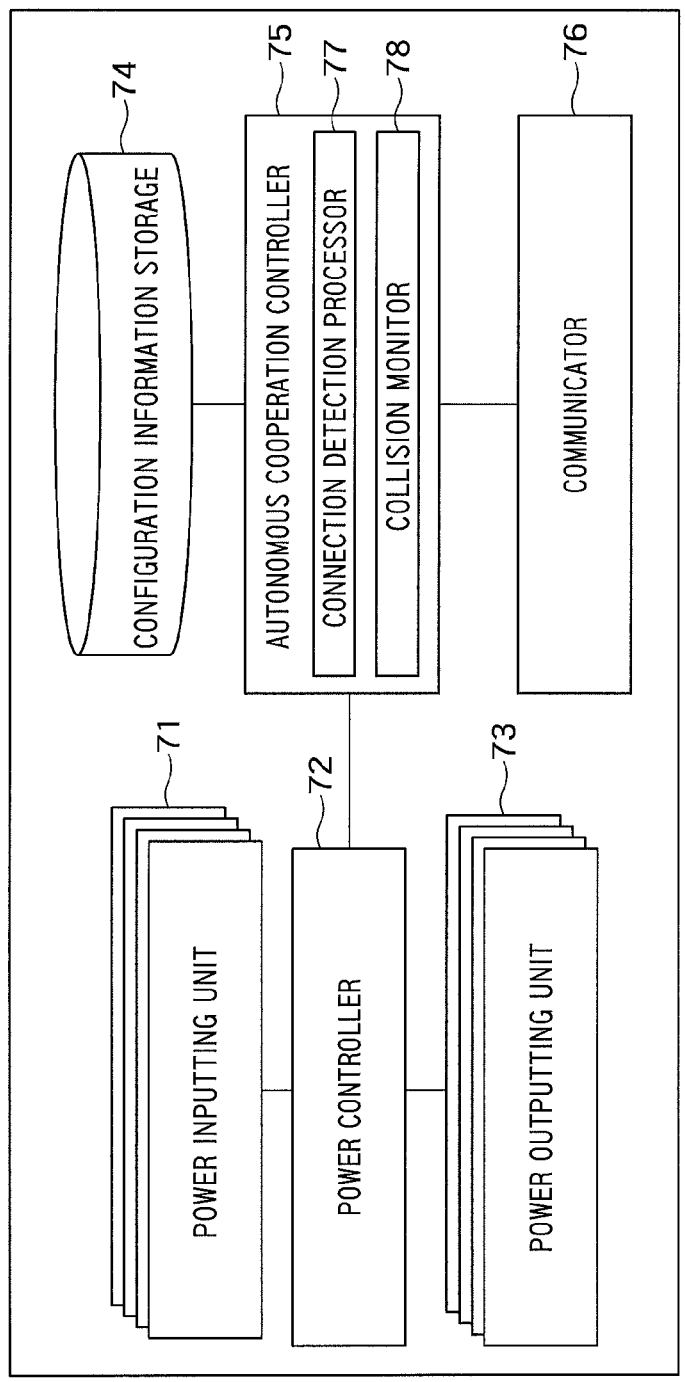
FIG. 6 is a device configuration diagram of a plurality of power electronics devices according to the embodiment of the present invention.

FIG. 6 presents a configuration example of a power electronics device according to the embodiment of the present invention.

As described above, the power electronics device is equivalent to the power electronics device connected to the energy storage (BMU) or the generator in the energy storage system/renewable energy system of FIG. 2. Alternatively, the power electronics device is equivalent to the first power electronics device connected to the energy storage (BMU) or the second power electronics device connected to the charger in the EV system of FIG. 3. In addition, the power electronics device is similarly equivalent to the power electronics devices in FIG. 4 and FIG. 5.

The power electronics device of FIG. 6 includes a power inputting unit (a connector) 71, a power controller 72, a power outputting unit (a connector) 73, an information storage 74, an autonomous cooperation controller 75, and a communicator 76.

The power inputting unit 71, the power controller 72, and the power outputting unit 73 serve, specifically, to convert power such as DC/AC, DC/DC, and AC/AC, to monitor and adjust the frequency of power, and to detect and adjust the fluctuation in voltage. The power inputting unit 71 and the power outputting unit 73 are each connected to a power line, and the power controller 72 performs the functions of the servings with respect to the power input/output via the power inputting unit 71 and the power outputting unit 73. In addition, the power controller 72 also has a function of generating an electric signal to the power lines connected to at least one of the power inputting unit 71 and the power outputting unit 73, and of detecting an electric signal from the power lines, under the control by the autonomous cooperation controller 75.

In addition to the configuration in which the plurality of power inputting units 71 and the plurality of power outputting units 73 exist, a conceivable configuration has one power inputting unit 71 and one power outputting unit 73. In an actual practice, there are cases where the power electronics device causes the power inputting unit 71 to receive the power from the energy storage (BMU) or the renewable energy generator, and where the power electronics device causes the power inputting unit 71 to receive the power through the power system network. Furthermore, the power received by the power inputting unit 71 is output through the power outputting unit 73 after being subjected to the power conversion such as DC/AC, DC/DC, and AC/AC. There is a configuration in which the power inputting unit 71 and the power outputting unit 73 are provided as physically separated power circuits, and in addition, there is a configuration in which they are provided as the same physically common circuit. Either of the configurations may be used.

In the embodiment of the present invention, the electric energy at the time of charging/discharging performed by the energy storage (BMU) or the generator is expressed as, in addition to an electric energy in Watt hour (Wh), the amount of current in Ampere hour (Ah), a voltage in Volt hour (Vh), or the amount of instantaneous power (W).

The communicator 76 serves to generate characteristics information or configuration information stored in a configuration information storage 74 to be described hereafter, as well as monitoring control information after starting the operation, as a communication message, and to exchange the communication signals of the message with an EMS, a local controller, or other power electronics device through the communication network. The communicator 76 may include, in addition to the serving to exchange the communication messages, a first communicator and a second communicator being a plurality of communication media.

For example, there is a conceivable form in which the first communicator is implemented by an optical fiber or telephone line, a wired communication medium including the Ethernet, as well as a wireless communication medium including the IEEE 802.11 wireless LAN, and the second communicator is implemented by the Ethernet or CAN, for example. The communication medium in the embodiment herein does not depend on a particular communication medium.

The power electronics device obtains communication messages from the EMS, the local controller, or the other power electronics device via the first communicator. Meanwhile, the second communicator obtains specific information (such as a rated capacity, a charge/discharge cut-off voltage, an upper temperature limit, a lower temperature limit, a maximum charge/discharge current, and a rated voltage) on the energy storage (BMU) or the renewable energy generator connected to the power electronics device, as well as obtains measurement information/setting information on the operation.

When the energy storage (BMU) is connected to the power electronics device, the second communicator periodically obtains measurement information (SOC, SOH, charging/discharging current, and charging/discharging voltage) being fluctuation information on the operation of the energy storage (BMU). The second communicator can be implemented by, as described above, the wired communication medium including the Ethernet or CAN, or an electric signal line originally defined by a vendor, but the embodiment of the present invention does not depend on particular communication media.

In addition, when the energy storage is connected to the power electronics device, sending only once the information such as SOC and SOH to the EMS, the local controller, or the other power electronics device is not enough since internal battery cells typically have the characteristics of self-discharge, so it is preferable to take into consideration the characteristics of the values changing every moment, and to notify as appropriate, as with the information such as voltage and current.

Furthermore, it is needless to say that the connection of the power electronics device operating as an inverter in the embodiment of the present invention is not limited to the connection to energy storages (BMU), the power electronics device is applicable to photovoltaic generators, wind power generators, or to a variety of EMSs or local controllers that communicate with them. The connection is not restricted to that to particular devices.

The information storage 74 stores information roughly divided into two categories, that is, "characteristics information" to determine master/slaves and "configuration information" to represent relationships between the master/slaves determined among the devices. Note that the information stored in the storage is not limited to these two categories.

The characteristics information is configured by pieces of information on, as presented in FIG. 7, a "device ID (Identifier)," a "device type," a "communication line connection," a "power line connection," and a "master/slaves." In addition, the characteristics information may contain communication property information (not shown).

The ID is individual identification information, for example, a serial number. The value of an electric signal that the power electronics device generates/detects when grasping power line connections can be managed in association with the ID.

The "device type" represents a role that the device fulfills in the system, taking the values including EMS/local controller, or power electronics device. In more detail, these values are divided into EMS, INV (AC/DC), INV (DC/DC), INV (DC/DC): power source (energy storage), INV (DC/DC): power source (PV), and INV (DC/DC): load. The device type may be called "power property information" in the following description.

The INV (AC/DC) is a synonym for a power electronics device that performs conversion between AC and DC, that is, a power electronics device (AC/DC). The INV (DC/DC) is a synonym for a power electronics device that performs conversion between DCs, that is, a power electronics device (DC/DC). The INV (DC/DC): power source is a synonym for a power electronics device (DC/DC) connected to a power source. The INV (DC/DC): power source is further distinguished on the basis of whether it is connected to an energy storage (BMU) or to a renewable energy generator using, for example, solar. The INV (DC/DC): power source (energy storage) is a synonym for an INV (DC/DC) connected to an energy storage (BMU). The INV (DC/DC): power source (PV) is a synonym for an INV (DC/DC) connected to a renewable energy generator. The INV (DC/DC): load is a synonym for a power electronics device (DC/DC) connected to a load.

It is conceivable that such information is obtained through communications such as the Ethernet and CAN when the power source or the load is connected to the power electronics device, otherwise a form is conceivable in which the information is static.

The "communication line connection" is information on devices in the same communication broadcast domain, and the "power line connection" is information on devices on the same bus.

The "master/slave" is information to identify a master (for a device to be a control entity) or a slave (for a device to be controlled).

The "power line connection" can be set through a plurality of procedures including:

"manual input and confirmation using a display terminal or the like by an operator";

"a first automatic recognizing method performed among the power electronics devices (the output of a particular power signal is notified through communication and then the behavior thereof on the power line is confirmed)";

"a second automatic recognizing method performed among the power electronics devices (the behavior of the output of a particular power signal on the power line is confirmed and then notified through communication)"; and "a compromise of the automatic recognizing and the manual input (e.g., the power electronics devices that are shifted to a particular operational state within the same time segment by the operation by an operator are recognized to be placed on the same bus)."

The embodiment of the present invention, in particular, relates to the automatic recognizing method.

It is assumed that the "manual input and conformation using a display terminal or the like by an operator" is a form in which an operator checks individual connection relationships by making a visual check or using a design drawing or the like and inputs the connection relationships into the power electronics device.

The "first automatic recognizing method performed among the power electronics devices" and the "second automatic recognizing method performed among the power electronics devices" are a matter of automaticity of detecting the power line connection information, such as to what extent the checking the connection relationships in terms of power or in terms of communication can be automated without the operations by the operator, and the extent of the automatic detection depends on operation standards or system configurations. The system configurations can include a plurality of configuration forms such as arranging the devices on the power line of the AC system, and arranging in a tree form from the AC system to the DC system.

Alternatively, if it is difficult to replace all the procedures by the operator with an automatic processing, an application is conceivable in which reconfirmation of the operation procedure is displayed after the above-described manual confirmation.

The "first automatic recognizing method performed among the power electronics devices" is a mode in which, for example, one side generates a pulse of, for example, voltage to the power bus, another side detects the pulse, and both exchange the pieces of detected information with each other through the communication network, and if it is determined that the pieces of information fall within a predetermined range of error, the connection in terms of power is thereby determined. The "second automatic recognizing method performed among the power electronics devices" is the reverse of the "first automatic recognizing method performed among the power electronics devices," that is, the notification through communication after the checking the behavior on the power line, rather than the checking the behavior on the power line after the notification through communication.

The communication property information can be information on a configuration of a communication control in the system, such as distributed communication processing and concentrated communication processing, information on categories of universal communication and synchronous communication, information on other devices to be connected in the communication, a role in the communication control (a base station or a slave station in a concentrated control). Alternatively, the communication property can be information in the role, such as the intensity of received signals in communicating with the other device, or the number of other devices connected thereto (the number of devices with which wireless links can be established directly without routing other devices, also called the number of accommodated devices).

The configuration information stored in the information storage 74 will be next described.

The configuration information is information on a device to be a master for the power electronics device, or a device to be a slave. The configuration information is configured by, as presented in FIG. 8, a "device ID," a "device type," a "communication line connection," a "power line connection," and a "master/slave."

These pieces of information are the same as those configuring the above-described characteristics information. For example, a power electronics device having a device ID of one is a power electronics device (INV (AC/DC)) that performs the AC/DC power conversion, can communicate with power electronics devices 2, 3, and 4, and is connected to a power line to which the power electronics devices 2, 3, and 4 are also connected, and the power electronics devices 2, 3, and 4 are slaves of the power electronics device 1 (the power electronics device 1 is a master).

The individual power electronics devices each cause the autonomous cooperation controller 75 to determine whether it is a master or a slave on the basis of the content of the characteristics information, and update the content of the configuration information. The method of determining a master/slave relationship will be described below in detail. In the present embodiment, a master/slave relationship is determined on the basis of the degree of priority.

The specific master/slave determination of the degree of priority is performed by comparing the device types in pieces of characteristics information on two devices. The devices are weighted in association with the type thereof such that a higher degree of priority is given to the type in the order of EMS>>INV (AC/DC)>>INV (DC/DC): power source (energy storage)>>INV (DC/DC): power source (PV)>>INV (DC/DC): load.

Each power electronics device, at the first start, comprehends the system type thereof (e.g., determines the system type thereof on the basis of information on a power source or a load connected to the power electronics device), and applies the type to the degree of master/slave determination priority. If the pieces of characteristics information are identical, it is conceivable, for example, that a device receiving the highest communication strength from other devices is determined as a master.

In addition, if the above-described degree of priority is not applicable, the master/slave is determined according to methods including "device started earlier," "device started later," "preset," and "at random."

Since EMSs are typically implemented by a computer to which an advanced algorithm processing can be applied, when an EMS exists in the system, it is preferable that the EMS is selected as a master in terms of performance. Local controllers are classified as EMSs.

Since the power electronics device (AC/DC) is placed at a superior position in view of the system configuration, as shown in FIG. 5C and FIG. 5D, the device is preferably selected as a master in terms of efficiency when the coordination with the power system network or the EMS is taken into consideration.

With respect to the power electronics device (DC/DC), a plurality of connection targets are possible, such as a power source (energy storage), a power source (PV), and a load. From the viewpoint of controllability, it is preferable to select a power source (energy storage), which can store the power required to operate in anticipation of the occurrence of abnormality, as a master, with a device having a highest probability of operating in the occurrence of abnormality taken into consideration.

Note that it is conceivable here that the power electronics device has device configurations physically separated for each function of the power conversion, or has an integrated function. For example, when the functions of the power conversion are integrated, the power electronics device can perform both of a process of AC/DC conversion and a process of DC/DC conversion. At this point, the possible expressions of power property information include a manner in which all the alternative functions of the power conversion are listed, as well as a manner in which a role in a system to be actually operated is used.

For example, when a power electronics device is detected to be connected to an AC power line in an actual system, the power electronics device is expressed as a power electronics device (AC/DC) even if the power electronics device can perform both of the process of AC/DC conversion and the process of DC/DC conversion.

Specifically, a possible method is to determine whether a device type is a power electronics device (AC/DC) or a power electronics device (DC/DC) in accordance with a role of inputting/outputting power while connected to a power line. When a power electronics device is connected to at least one AC bus, and connected to at least one DC bus, the device type of the power electronics device can be determined as AC/DC. When the power electronics device is connected to the bus of either type, the device type is determine as AC/AC or DC/DC.

The autonomous cooperation controller 75 of the power electronics device can perform the operation in initial installation such as the determination of master/slave or the operation in the occurrence of abnormality, as well as can process real time monitoring control information and non-real-time monitoring control information that are required for a power application function in the regular operation.

The real time monitoring control information to be processed includes, for the function of the phase synchronization control of output power, for example, command values and measured values of a voltage and a frequency, as well as time synchronization information. In addition, the non-real-time monitoring control information includes operation planning information.

The operation planning information is planning information based on requests from the energy storage (BMU) or the renewable energy generator and the power system network that are connected to the power electronics device, and can be expressed in the forms of, for example, "horizontal axis: time, vertical axis: electric energy." To configure this information, as one example, there is a method of using information specific to a charging/discharging control of the energy storage (BMU) or the renewable energy generator. For example, in general, there are notions with respect to the energy storage (BMU), including a rated charging/discharging power in Watt (W), a rated capacity in Watt hour (Wh), a charging rate (SOC: State Of Charge) in percentage, and a possible discharge time and a possible charge time associated with the SOC.

In constant-current charge, which is a normal charging mode of energy storages (BMUs), electric energy (the amount of current) input/output by battery cells in the energy storage (BMU) remains in a certain state until the SOC in percentage reaches a predetermined threshold value. For this reason, obtaining the value of SOC from the energy storage (BMU) allows for calculating a possible charge time and a possible discharge time, a maximum charging/discharging power, and electric energy (the product of the possible charge/discharge time and the power) required for charging/discharging, which are associated with the information. The constant-current charge has characteristics in that the amount of current required to charge is minimized after the SOC excess the predetermined threshold value, which allows for roughly calculating information required for the charging/discharging plan.

Note that, for the electric energy in the charging/discharging control, an electric energy in Watt Hour (Wh) can be used, as well as the amount of current in Ampere hour (Ah) and a voltage in Volt hour (Vh) can be used.

Meanwhile, in the case of the renewable energy generators such as photovoltaic generators or wind power generators, since the power cannot be stored (charged), there is no concept of SOC, and the generators operate as devices for discharging only. In contrast, in the case where a device connected to the power electronics device is a thermal storage device, the device is controlled as a device for charging only, since it cannot discharge power.

The operation plan of the power electronics device is designed, on the basis of these pieces of information, for carrying out a specific charging/discharging operation to a power source (or a load) connected to the device.

To prevent momentary interruptions of power supply in the power system network, it is desirable that the power electronics device operates in a real time manner, exchanging communication messages as appropriate. On the other hand, to perform controls at relatively long intervals during a time period in the nighttime, it is desirable that the power electronics device operates in a non-real-time manner by setting an operation timing interval. The embodiment of the present invention does not depend on particular operation modes such as the real time operation and the non-real-time operation.

The autonomous cooperation controller includes a connection detection processor 77 and a collision monitor 78, the connection detection processor 77 that implements the automatic detection of other power electronics devices (including local controllers and EMSs) connected to a power line to which at least one of the power inputting unit 71 and the power outputting unit 73 is connected.

The connection detection processor 77 performs a connection detection process to detect other power electronics devices connected to the power line using the power controller 72. The collision monitor 78 monitors whether or not the collision of electric signals occurs on the power line during the connection detection process, and controls the connection detection processor 77 according to monitoring results.

As one example, the collision monitor 78 generates an electric signal to notify the existence of the device, to the power line using the connection detection processor 77 and the power controller 72, and if, during the application of the electric signal, detecting that another power electronics device generates an electric signal to the power line, the collision monitor 78 controls the connection detection processor 77 to stop generating the electric signal.

The collision monitor 78 may control the connection detection processor 77 to generate the electric signal again using the power controller 72 if determining that the other power electronics device stops generating the electric signal.

In addition, the connection detection processor 77 may generate the electric signal to notify the existence of the device, to the power line using the power controller 72, and if the power controller 72 detects an electric signal from another power electronics device on the power line after the lapse of, for example, a certain period of time from completing the application of the electric signal, the connection detection processor 77 may determine that it has a connection relationship with the other power electronics device through the power line.

Note that if the electric signal is not detected in the case where the connection detection processor 77 has determined that it has the connection relationship with the other power electronics device before, the connection detection processor 77 may determine that it has no connection relationship with the other power electronics device. Alternatively, the connection detection processor 77 may determine that it has no connection relationship with the other power electronics device if no response (it is the electric signal here, but it may be a communication signal (communication message) in another example to be described hereafter) is detected from the other power electronics device after repeating connection detection sequence a plurality of times. This similarly applies to the following other detection sequences.

Alternatively, the connection detection processor 77 may generate the electric signal to notify the existence of the device, to the power line using the power controller 72, and if receiving a communication message regarding the detection of an electric signal from another power electronics device via the communicator 76 after the application of the electric signal is completed, the connection detection processor 77 may determine that it has a connection relationship with the other power electronics device through the power line.

Alternately, the connection detection processor 77 may transmit a communication message regarding preliminary notice of generating an electric signal to notify the existence of the device, to another power electronics device using the communicator 76, and thereafter generate an electric signal to notify the existence of the device, to the power line using the power controller 72, and if receiving a communication message regarding the detection of an electric signal from the other power electronics device via the communicator 76 after the application of the electric signal, the connection detection processor 77 may determine that it has a connection relationship with the other power electronics device through the power line.

Alternately, if detecting, during the application of the electric signal, that the other power electronics device generates an electric signal to the power line, the collision monitor 78 may control the connection detection processor 77 to stop generating the electric signal, and if determining that the other power electronics device stops generating the electric signal, the collision monitor 78 may control the connection detection processor 77 to transmit the communication message and generate the electric signal, using the power controller 72.

The connection detection processor 77 may transmit to the other power electronics device a communication message to instruct it to generate an electric signal, using the communicator 76, and if thereafter detecting the electric signal from the other power electronics device on the power line via the power controller 72, the connection detection processor 77 may determine that it has the connection relationship with the other power electronics device through the power line.

The connection detection processor 77 may assign a specific identifier to a whole of all the devices connected to the power line, and may update the specific identifier when a new connection relationship with a power electronics device is confirmed through the power line or when a connection relationship with at least one of the other power electronics devices is no longer confirmed through the power line.

The connection detection processor 77 may transmit a detected value of the electric signal generated by the power controller 72 to the other power electronics device using the communicator 76, receive a value of an electric signal detected by the other power electronics device from the other power electronics device, and if the detected value of the electric signal generated by the power controller 72 and the detected value of the electric signal received from the other power electronics device fall within a predetermined range, the connection detection processor 77 may determine that it has the connection relationship with the other power electronics device through the power line.

Note that, part of or the whole of the configuration of FIG. 6 is not limited to the application to the power electronics device, and is similarly applicable and feasible to EMSs, local controllers, or the like. In this case, the EMSs, the local controllers, or the like manage pieces of information on individual power electronics devices being in a connection relationship with each other, and dynamically perform the provision of identification information on the whole system and a collective control.

FIG. 9 presents an operation flow chart of the power electronics device according to the embodiment of the present invention. The flow of an operation process includes initial installation, regular operation, and the occurrence of abnormality, and the flowchart of the drawing aims at configuration detection and configuration determination in the cases other than the regular operation, that is, the initial installation and the occurrence of abnormality.

As shown in FIG. 9, prior to determining master/slave on the basis of the characteristics information and configuration information, to dynamically detect a system configuration, it is required to detect connections on the power line and to detect connections on the communication line.

Figure 9A:
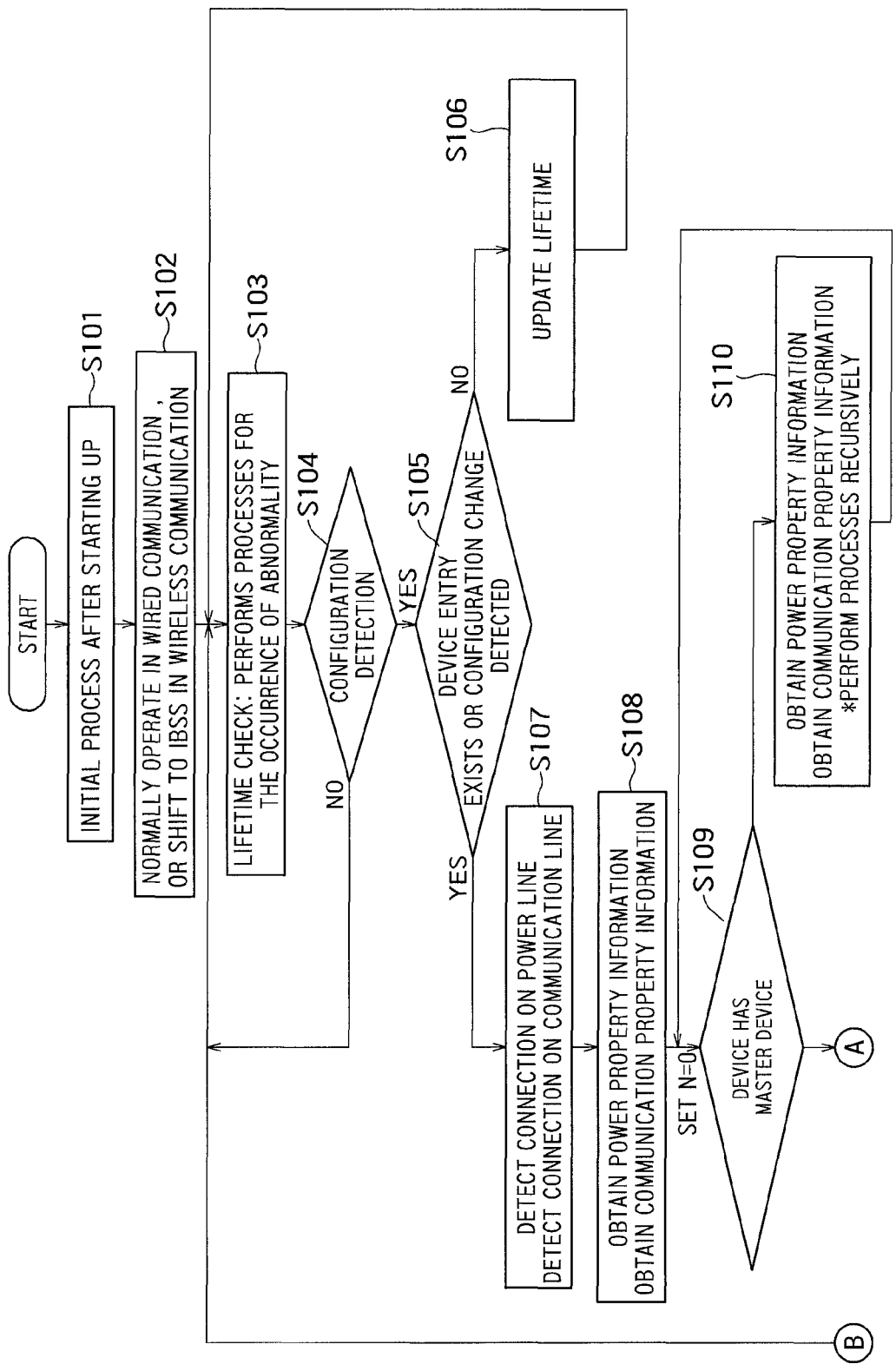
FIG. 9A is an operation flow chart of the power electronics device according to the embodiment of the present invention.
Figure 9B:
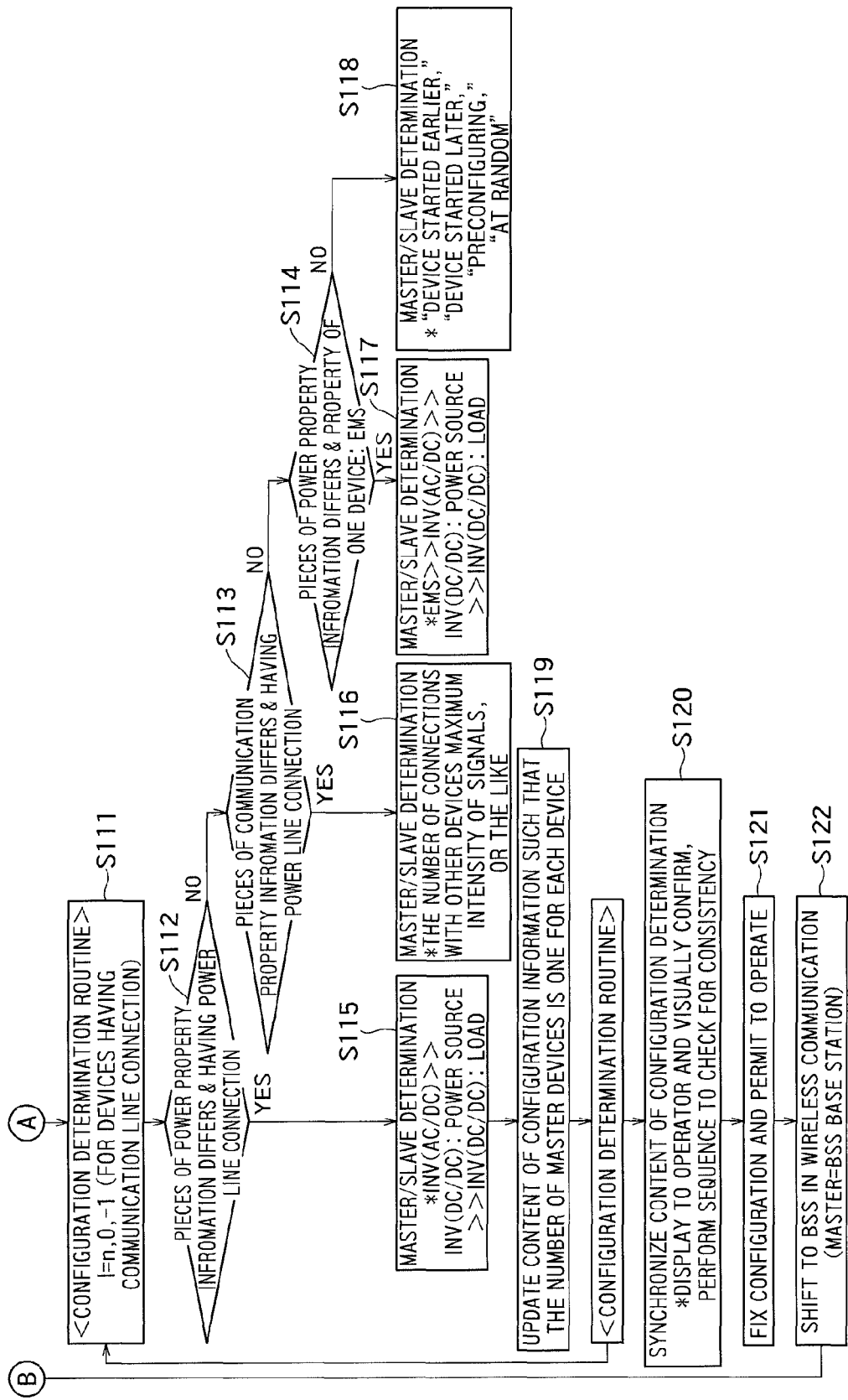
FIG. 9B is an operation flow chart of the power electronics device according to the embodiment of the present invention.

FIG. 9A and FIG. 9B present operation flow charts in automatic configuration management of the power electronics devices according to the embodiment of the present invention. This operation flow merely shows one example, and the present embodiment is not limited thereto. Although the entire operation process includes the initial installation, the regular operation, and the occurrence of abnormality, the flowcharts of FIG. 9A and FIG. 9B aims at the configuration detection and the configuration determination in the initial installation or in the occurrence of abnormality.

In step S101, at the initial installation (an initial process after starting up), the power electronics device obtains property information on itself, and determines whether it is an EMS, an INV (AC/DC), or an INV (DC/DC). The power electronics device further determines whether a devices such as a power source and a load directly connected to the power electronics device is an INV: power source (energy storage), an INV: power source (PV), or an INV: load.

In step S102, the power electronics device confirms the communication mode thereof, and normally operates when the communication mode is a wired communication, or shifts to IBSS (Independent Basic Service Set), a distributed communication, when the communication mode is a wireless communication.

In step S103, the power electronics device performs a lifetime check, and determines to perform the configuration detection in step S104. If there is no device entry or there is no change in the configuration (NO at S105), the power electronics device waits a certain period of time (extends the lifetime), and the flow returns to step S103. In the lifetime check, the power electronics device checks whether or not an abnormality occurs, and if an abnormality is detected, the power electronics device determines to perform the configuration detection (YES at S104). If there is a device entry or there is a change in the configuration, the flow proceeds to step S107. The power electronics device may determine whether or not there is a device entry or there is a change in the configuration by, for example, receiving an advertisement from another device. When the device starts, it is determined that there is a device entry since the device is a device entry. In addition, when a device connected to the device is changed, it can be determined that the configuration has changed.

In step S107, the power electronics device identifies a device connected to the power line to which the device is connected, and a device that can communicate with the device by detecting a connection on the power line or a connection on the communication line, in order to dynamically detect the system configuration. Note that the communication line can include both wired one and wireless one. In step S108, the power electronics device obtains automatic configuration information (characteristics information and configuration information) including the power property information and the communication property information from a device that can be communicated with, through the wireless or wired communication network. If the other device has a master (YES at S109), the power electronics device recursively executes steps S108, S109, and S110 to the master.

That is, there is the case where, when the power electronics device obtains the information or the like from the other device, the other device has already determined a master or slaves with respect to yet another device. In this case, the power electronics device further tries obtaining information on a device being the master written in the information on the other device. It is thereby possible to avoid duplication of master in the system where a plurality of power electronics devices are installed, so as to prevent conflict over a control right at the time of implementing an autonomous cooperative power application function such as the phase synchronization control of output power or the power sharing control.

The flow shifts to a configuration determination routine to determine the master/slave after the series of information obtaining processes is completed, but it is preferable to confirm a communication line connection and a power line connection between devices to be determined before performing specific configuration determination.

As described above, the power electronics device in the embodiment of the present invention implements different power application functions (phase synchronization control of output power and power sharing control) in combination with a plurality of devices, but the connection relationship in terms of communication and the connection relationship in terms of power do not necessarily have a one-to-one correspondence according to an installation mode of the system.

For example, a set of power electronics devices is defined as S, and subsets of S are defined as S1 and S2 (S1∪S2=S, S1∩S2=∅). Assume that the power electronics devices of S_i (i=1, 2) are connected to an electricity network P_i and a communication network C_i, and the number of resulting connection relationships in terms of communication and in terms of power are four in total, so it is preferable to determine whether to start the determining process of the master/slave according to the respective conditions.

For example, if two power electronics devices have a connection relationship in terms of communication but have no connection relationship in terms of power, the two power electronics devices are not connected to the same bus, which does not need a synchronizing process for the phase synchronization control of output power or the power sharing control.

Note that an algorithm to obtain and distribute the automatic configuration information on master/slave includes the above-described procedure to recursively inquire, and it is conceivable to apply a procedure in which the information is collectively managed in the system using broadcast communication, multicast communication or the like. The embodiment of the present invention does not depend on particular procedures.

After confirming the connection relationships, the power electronics devices each determine master/slaves using the autonomous cooperation controller on the basis of the content of the obtained information (S111 to S119), and update the content of the automatic configuration information. The master/slave determination for the phase synchronization control of output power is performed in the case where one of predetermined conditions is satisfied, such as where an abnormality occurs in the power system due to blackout or the like and reference values used for phase locking cannot be received, and where the autonomous operating is performed in a factory or the like without receiving references from the outside, and the determination is performed to the AC power line. The determination is not needed for the DC power line because it does not need phase locking.

In this flow, the determination is performed to devices having the connection relationship through the communication line. The master/slave determination is performed (S115, S116, S117, and S118) according to the case where the devices have different pieces of the power property information and have a connection relationship through the power line (YES at S112), the case where the devices have different pieces of communication property information and have a connection relationship through the power line (YES at S113), the case where the devices have different pieces of power property information and one of them has the device type of an EMS (S114), and the other case (NO at S114).

The specific master/slave determination of the degree of priority is performed by iterating a loop for comparing device types between two devices. The master/slave is determined by applying the degrees of priority that are weighted a determination criterion (device type) in the order of EMS>>local controller>>INV (AC/DC): energy storage>>INV (AC/DC): photovoltaic>>INV (AC/DC)>> INV (DC/DC): energy storage>>INV (DC/DC): photovoltaic>>INV (DC/DC)>>smart meter (S115 and S117). This is in particular equivalent to the determination regarding the power sharing control.

Each device, at the first start, comprehends the system type thereof (e.g., on the basis of information on a power source or a load connected to the power electronics device), and applies the type to the degree of master/slave determination priority. Local controllers are classified as EMSs. Since the power electronics device (AC/DC) is placed at a superior position in view of the system configuration as described above, a local controller is preferably selected as a master in terms of efficiency when the coordination with the power system network or the EMS is taken into consideration. The power electronics device (DC/DC) can be connected to a plurality of types of devices such as a power source (energy storage), a power source (PV), and a load. From the view point of controllability, it is preferable to select a power source (energy storage), which can store the power required to operate in anticipation of the occurrence of abnormality, as a master, with a device having a highest probability of operating in the occurrence of abnormality taken into consideration.

If the devices have the connection relationship through the power line while having different pieces of communication property information, the master/slave is determined on the basis of the number of connections, the intensity of signals, or the like from the other devices, which is communication property information (S116).

If the pieces of power property information (device types) are the same, it is conceivable that, for example, a device having a greater sequence number in the configuration information (refer to FIG. 8) (a device having a greater number of updating of the configuration information) is determined as a master. In addition, if the above-described degree of priority is not applicable, it is conceivable that the master/slave is determined according methods including "device started earlier," "device started later," "preconfiguring," and "at random" (S118).

In addition, each power electronics device updates the content of the configuration information such that the number of the masters is one (S119).

If an autonomous cooperative power application function is performed halfway during such master/slave configuration determination, conflict over a control right may occur, and it is therefore preferable to display the content of the configuration determination to an operator and cause the operator to visually check it, or to execute an operation sequence to check it for consistency (S120). As the operation sequence being the latter one, it is conceivable that the start of the regular operation is waited a certain period of time in order to make pieces of information on a plurality of devices existing in the system identical to one another, or pieces of automatic configuration information are consecutively obtained and the contents thereof are compared.

When confirming that the contents of the pieces of configuration information are identical to one another, the devices each fix a master/slave configuration with this content, and each determine to permit it to operate. The devices each determining to permit itself to operate perform a cooperative operation (S121). The devices thereafter, when the communication mode is a wireless communication, shift to BSS (Basic Service Set), a concentrated communication, with the master set as a BSS base station, and the flow returns to step S103.

In the regular operation after the configuration determination is completed, the devices exchange communication messages regarding a real time control/non-real-time control with one another to perform a monitoring control to the power. For example, information for monitoring includes a current value of active power (W), a current value of reactive power (VAR), a unit voltage per phase, and a current value of power factor. In addition, information for controlling includes permission to connect to the electricity network, permission to use of PV output, permission to use of energy storage output, permission to use of a active power/reactive power control, a target value of active power (W), a target value of reactive power (VAR), a target value of power factor, a value of output level of active power (%), a value of output level of reactive power (%), and a value of frequency. Furthermore, rated information includes a rated active power (W), a rated apparent power (VA), and a rated reactive power (VAR). As a possible general embodiment, control information can be both read and written, and monitored/rated information can be only read.

A procedure to automatically detect power line connections between a plurality of power electronics devices will be described below with reference to FIG. 10 to FIG. 18.

FIG. 10 presents preconditions for the automatic detection. To implement a specific procedure and a specific protocol design for the configuration detection of the power line/communication line, it is required to use the device IDs, voltages/currents that the devices generate/detect, and points in time (timings) in combination. Generally, in the communication control, if a plurality of devices generates and transmits communication messages at the same time, a collision on a propagation path occurs, and information is not correctly transmitted to an entity at the end of the communication, which is problematic. Communication technologies to solve this problem are established, including CSMA/CD (Carrier Sense Multiple Access/Collision Detection) capable of detecting a collision during the communication, and CSMA/CA (Carrier Sense Multiple Access/Collision Avoidance) capable of avoiding a collision by receiving an acknowledgement after the communication.

Meanwhile, with respect to handing signals on the power line, if the power electronics device handles a high level of voltage/current, it is difficult to transmit information consisting of a plurality of bits on the power line, like in PLC (Power Line Communication) used in houses or the like, because of noise or the like originating from electric circuitry. It is thus required to take collision/loss of signals on the power line such that a plurality of power electronics devices dynamically grasps connections on the power line.

A first precondition for this is about a method of determining an electric signal performed by each device. As described above, the electric signal generated/detected by the power electronics device has a predetermined level of voltage (one bit in terms of information). Therefore, specific detection procedures differ according to whether the device IDs and a rule about the electric signals are known or unknown to the devices. The upper left portion of FIG. 10 shows that an electric signal is generated to the power line from the power electronics device 1 to the power electronics device 2, which is detected by the power electronics device 2. At this point, the detection procedure differs according to whether or not the power electronics device 2 knows the level of voltage (or the level of current) that the power electronics device 1 generates. The upper right portion of FIG. 10 shows the values of voltages and currents of the electric signals of the power electronics devices 1, 2, and 3, and the detection procedure differs according to whether or not these are known to the power electronics devices in advance.

In addition, a second precondition is that the specific detection procedure differs according to whether or not the device includes an AIO (Analogue Input Output: a line to transmit information on the application of voltage/current directly to individual devices) installed, and can individually and directly monitor the detection of collision/loss of the electric signals. Dotted lines in the lower left portion of FIG. 10 show a form in which the power electronics devices each include an AIO installed, and each pair of power electronics devices has a wired connection with the AIO. When outputting an electric signal (analog signal) to the power line, the power electronics device can notify the outputting to other power electronics devices via the AIO, which allows for individual and direct monitoring of the collision/loss of the electric signals. The lower right portion of FIG. 10 shows a form in which the power electronics devices each have no AIO installed.

These preconditions are organized and all the resulting specific procedures are presented in FIG. 11. These procedures are roughly categorized into two procedures on the bases of the above-described preconditions, including the case where a power line connection is detected with only the power line, and the case where a power line connection is detected with both the power line and the communication line, and more in detail, these procedures are categorized into five procedures. Note that the case where a physical medium to be used is only the communication line is excluded from these five procedures because a power line connection cannot be grasped.

Note that, in FIG. 11, in grasping a power line connection using only the power line, since a plurality of pieces of information cannot be transmitted, a plurality of power electronics devices determines in advance which device generates an electric signal of which level, and if detecting the application of a level, a device determines that it has a power line connection with the corresponding device.

On the other hand, in grasping a power line connection using both the communication line and the power line, since a couple of pieces of information on a device and the level of the electric signal generated by the device can be exchanged dynamically, there are, by mixing these procedures, both approaches of an push approach in which one device transmits an electric signal to another device, and a pull approach in which one device listens to (receives) an electric signal from another device.

Examples of communication messages to transmit a device ID or an electric signal corresponding thereto using the communication line are presented in FIG. 32 and FIG. 33. FIG. 32 and FIG. 33 show a communication message regarding a connection acknowledgement request, and a communication message regarding a connection acknowledgement response. The push approach and the pull approach can be implemented by interpreting information with respect to these communication messages in appropriate ways.

Operation sequences regarding connection detection on the power line corresponding to these five procedures are shown in FIG. 14, FIG. 15, FIG. 16, FIG. 17, and FIG. 18. In each drawing, an IFS (Inter Frame Space) represents a fixed waiting time, and a BO (Back Off) represents a random waiting time, but the present embodiment does not depend on particular forms of these waiting times.

Figure 14:
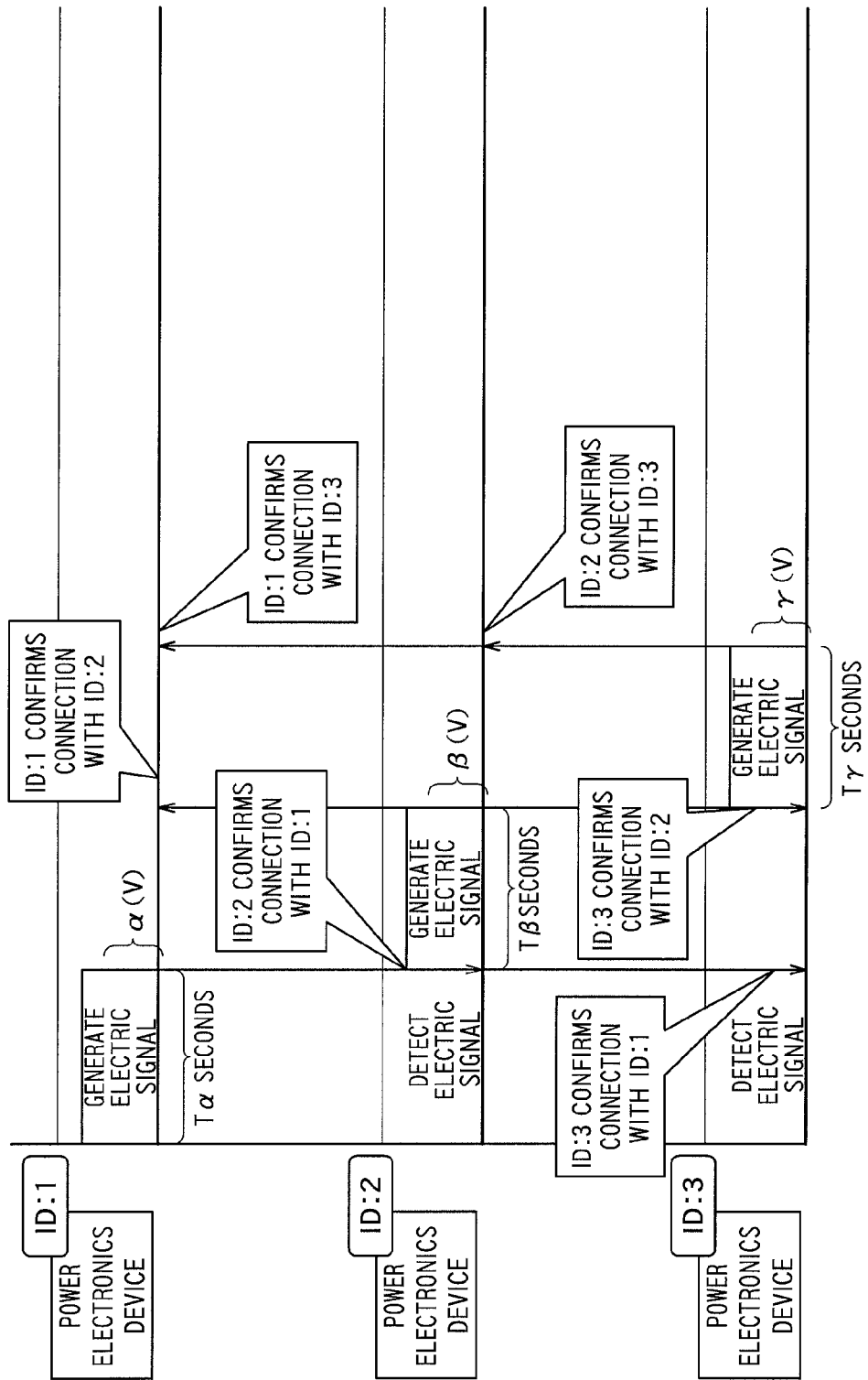
FIG. 14 is a diagram illustrating the dynamic grasping of power line connections according to the embodiment of the present invention.

FIG. 14 shows the operation sequence regarding the connection detection on the power line, corresponding to the case where a physical medium to be used is only the power line, the device IDs and the electric signals (the levels of voltage or current, or both) of the devices are known, and the power electronics devices includes the AIO installed. In the case of using AIO, it is assumed that the power electronics devices do not fail in the connection detection since the collision of electric signals can be basically isolated and analyzed even if it occurs. However, assuming an environment where the generated electric signal contain noise, a form may be installed in which whether or not the electric signal can be correctly transmitted or received is determined.

Since the power electronics devices each include the AIO installed and the inputs/outputs of electric signals can be determined at the same time for each device, there is no restriction on timings to generate an electric signal, and the devices can therefore start/stop generating electric signals at any timing. In this example, the power electronics device 1 generates an electric signal of $\alpha$ (V) for T$\alpha$ seconds, and the power electronics devices 2 and 3 each detect the electric signal to confirm a connection with the power electronics device 1. The reason for generating the electric signal for T$\alpha$ seconds will be described. Although the power electronics device can basically confirm the connection the instant when detecting the electric signal if the electric signal is at a predetermined level of voltage (or current), the connection is considered to be confirmed when a voltage (or current) is consecutively detected for a predetermined period of time, with noise arising in the power line taken into consideration. As an example based on the same idea, in the wireless communication, a predetermined bit pattern (called a preamble) is prepended to a wireless packet, and a process shifts to analyzing the inside of the wireless packet upon detecting the pattern.

The power electronics device 2 thereafter generates an electric signal of $\beta$ (V) for T$\beta$ seconds, and the power electronics devices 1 and 3 each detect the electric signal to confirm a connection with the power electronics device 2. The power electronics device 3 thereafter generates an electric signal of $\gamma$ (V) for T$\gamma$ seconds, and the power electronics devices 1 and 2 each detect the electric signal to confirm a connection with the power electronics device 3. The reason for generating the electric signal for T$\beta$ seconds or T$\gamma$ seconds is similar to the case of T$\alpha$. Note that, in this procedure, if the plurality of power electronics devices generates the electric signals at the same time, the collision of them is detected through the AIO. In this case, the process may be started again after the detection through the AIO stops.

Figure 15:
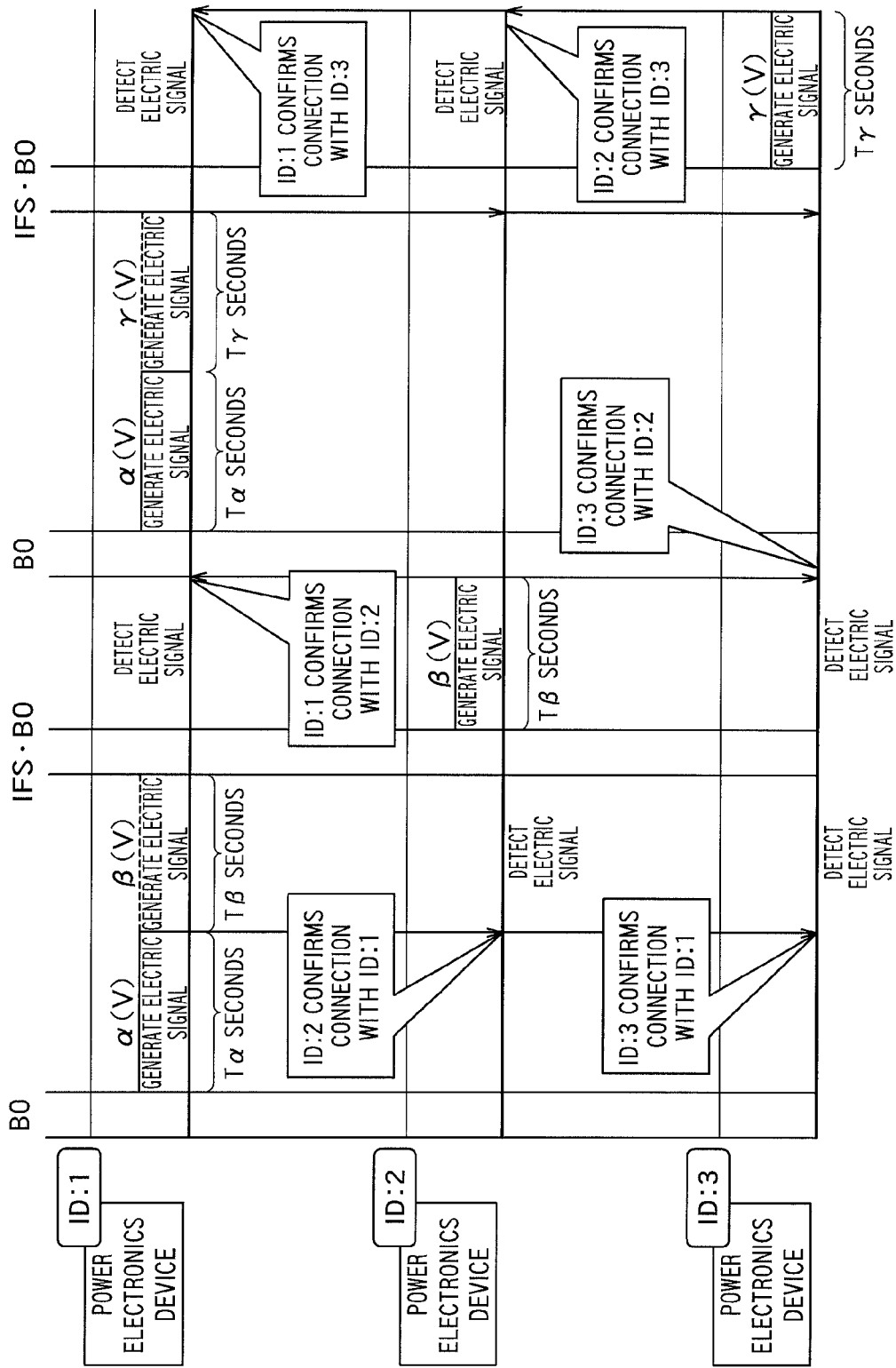
FIG. 15 is a diagram illustrating the dynamic grasping of power line connections according to the embodiment of the present invention.

FIG. 15 shows the operation sequence regarding the connection detection on the power line, corresponding to the case where a physical medium to be used is only the power line, the device IDs and the electric signals of the devices are known, and the power electronics devices each do not include AIO installed.

The power electronics device 1 generates an electric signal of $\alpha$ (V) for T$\alpha$ seconds, and next generates an electric signal of $\beta$ (V) for T$\beta$ seconds. The power electronics device 1 notifies the existence of the device by outputting $\alpha$ (V), and designates the power electronics device 2 by successively outputting $\beta$ (V) so as to prompt the power electronics device 2 to output $\beta$ (V) to notify the existence. However, the operation of outputting the electric signal of $\beta$ (V) by the power electronics device 1 is not mandatory, which is indicated by a dotted line meaning that the operation is omissible. The power electronics devices 2 and 3 each confirm a connection with the power electronics device 1 by detecting the electric signal of $\alpha$ (V) for T$\alpha$ seconds from the power line. The power electronics device 2 determines that it is requested to return the notification of the existence to the power electronics device 1 by detecting the electric signal of $\beta$ (V) for T$\beta$ seconds, and the power electronics device 2 outputs an electric signal of $\beta$ (V) for T$\beta$ seconds to the power line. The power electronics device 1 determines to be connected to the power electronics device 2 that the power electronics device 1 has prompted to return the notification of the existence of the power electronics device 2, by detecting the electric signal of $\beta$ (V) for T$\beta$ seconds from the power line. The power electronics device 1 designates a power electronics device to return the notification of the existence, which avoids the collision of electric signals that occurs by a plurality of power electronics devices generating the electric signals at the same time.

Note that the power electronics device 2 outputs the electric signal for T$\beta$ seconds for which the power electronics device 1 also outputs the electric signal, but this is merely one example, and there are no restrictions on the operation thereof. This similarly applies to the following description.

The power electronics device 3 detects the electric signal of $\alpha$ (V) for T$\alpha$ seconds from the power line to confirm a connection with the power electronics device 1, but determines that it is not requested to issue the notification of the existence from the power electronics device 1. The power electronics device 3 does not therefore generate an electric signal different from that of the power electronics device 2, at this point. When the power electronics device 3 thereafter detects that the power electronics device 1 outputs $\alpha$ (V) for T$\alpha$ seconds and successively outputs $\gamma$ (V) for T$\gamma$ seconds, the power electronics device 3 determines that it is requested to issue the notification of the existence by the power electronics device 1, and generates an electric signal of $\gamma$ (V) for T$\gamma$ seconds. The power electronics device 1 determines to be connected to the power electronics device 3 that the power electronics device 1 has prompted to return the notification of the existence of the power electronics device 3, by detecting the electric signal of $\gamma$ (V) for T$\gamma$ seconds from the power line.

In the above-described sequence, if the power electronics device, during the application of the electric signal, detects that another power electronics device generates an electric signal to the power line, the power electronics device stops generating the electric signal. The power electronics device may thereafter generate the electric signal again if determining that the other power electronics device stops generating the electric signal.

Figure 16:
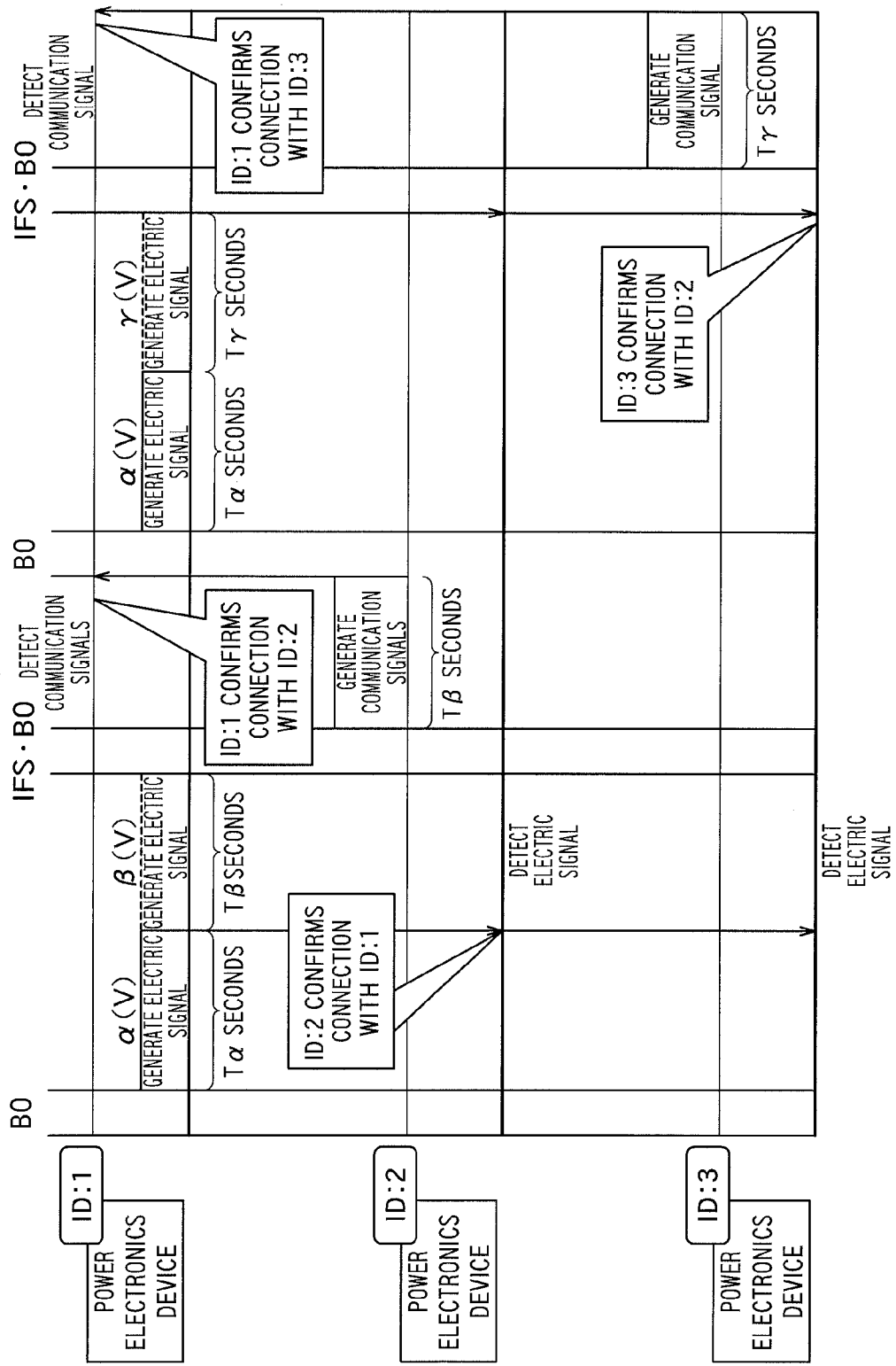
FIG. 16 is a diagram illustrating the dynamic grasping of power line connections according to the embodiment of the present invention.

FIG. 16 shows the operation sequence regarding the connection detection on the power line, corresponding to the case where physical media to be used are both the power line and the communication line, the device IDs and the electric signals of the devices are known. Note that this sequence is applicable regardless of whether the power electronics devices each include the AIO installed or not.

The power electronics device 1 generates an electric signal of α (V) for Tα seconds, and next generates an electric signal of β (V) for Tβ seconds. The power electronics device 1 notifies the existence of the device by outputting α (V), and designates the power electronics device 2 by successively outputting β (V) so as to prompt the power electronics device 2 to output β (V) to notify the existence. However, the operation of outputting the electric signal of β (V) by the power electronics device 1 is not mandatory, which is indicated by a dotted line meaning that the operation is omissible. The power electronics devices 2 and 3 each confirm a connection with the power electronics device 1 by detecting the electric signal of α (V) for Tα seconds.

The power electronics device 2 determines it is requested to return the notification of the existence to the power electronics device 1 by detecting the electric signal β (V) for Tβ seconds, and the power electronics device 2 generates (transmits) a communication signal to the power electronics device 1. The detection for Tβ seconds may be notified by containing information on Tβ in the message of the communication signal. Note that this is merely one example, and the present embodiment is not limited to this operation. The power electronics device 1 confirms a connection with the power electronics device 2 by receiving the communication signal from the power electronics device 2. The power electronics device 1 thereafter confirms also a connection with the power electronics device 3 through the same procedure.

In this procedure, the power electronics device 1 designates the power electronics devices 2 and 3 in turn and successively receives the communication signals from them to confirm the connections with the devices, but the power electronics device 1 may designate all the devices by generating the electric signal of α (V) and thereafter generating an electric signal of a voltage to designate all the devices, or stopping the application of the voltage such that each device that detects the electric signal of α (V) transmits the communication signal. In the case where a CSMA-based system is adopted as the wireless communication system, the communication efficiency may be reduced due to collisions, but such a problem does not arise if the adopted communication system is a time division multiple access communication or the like.

Figure 17:
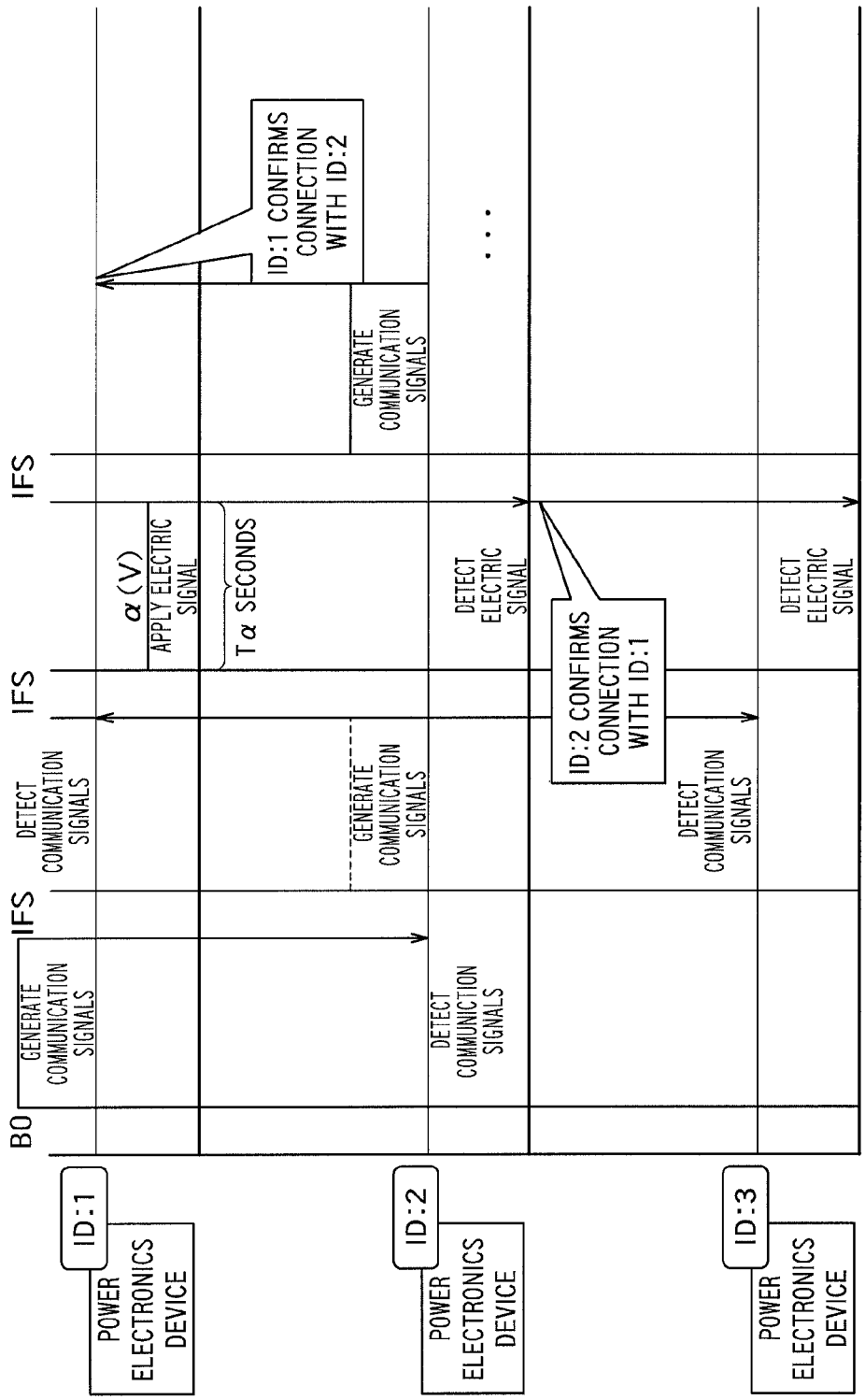
FIG. 17 is a diagram illustrating the dynamic grasping of power line connections according to the embodiment of the present invention.

FIG. 17 shows the operation sequence regarding the connection detection on the power line, corresponding to the case where physical media to be used are both the power line and the communication line, and the device IDs and the electric signals of the devices are unknown. Note that this sequence is applicable regardless of whether the power electronics devices each include the AIO installed or not.

The power electronics device 1 generates (transmits) a communication signal addressed to the power electronics device 2. At this point, the content of the communication signal designates a device intended to detect an electric signal, and specifies the level of application (α (V)) and the application time (Tα seconds) of the electric signal that the power electronics device 1 generates (refer to the connection acknowledgement request message of FIG. 32). Note that the device ID of the designated device may be obtained in advance through communication therewith, or if only a communication address is known, the communication signal may be transmitted to the address without specifying the device ID.

Upon detecting the communication signals from the power electronics device 1, the power electronics device 2 returns a communication signal as a response signal. The response signal may contain the specification of the level of application (α (V)) specified by the power electronics device 1 (refer to the connection acknowledgement response message of FIG. 33). However, this operation is not mandatory, which is indicated by a dotted line. The power electronics device 1 that receives the response signal from the power electronics device 2 generates an electric signal of α (V) for Tα seconds to the power line. Upon detecting this, the power electronics device 2 confirms a connection with the power electronics device 1, and generates a communication signal addressed to the power electronics device 1. Upon detecting this communication signal, the power electronics device 1 confirms a connection with the power electronics device 2.

Note that if the power electronics device 1, during the application of the electric signal of α (V), detects that another power electronics device generates an electric signal to the power line, the power electronics device 1 stops generating the electric signal. The power electronics device 1 may thereafter transmit the communication signal (communication message) and generate the electric signal again, if determining that the other power electronics device stops generating the electric signal.

Figure 18:
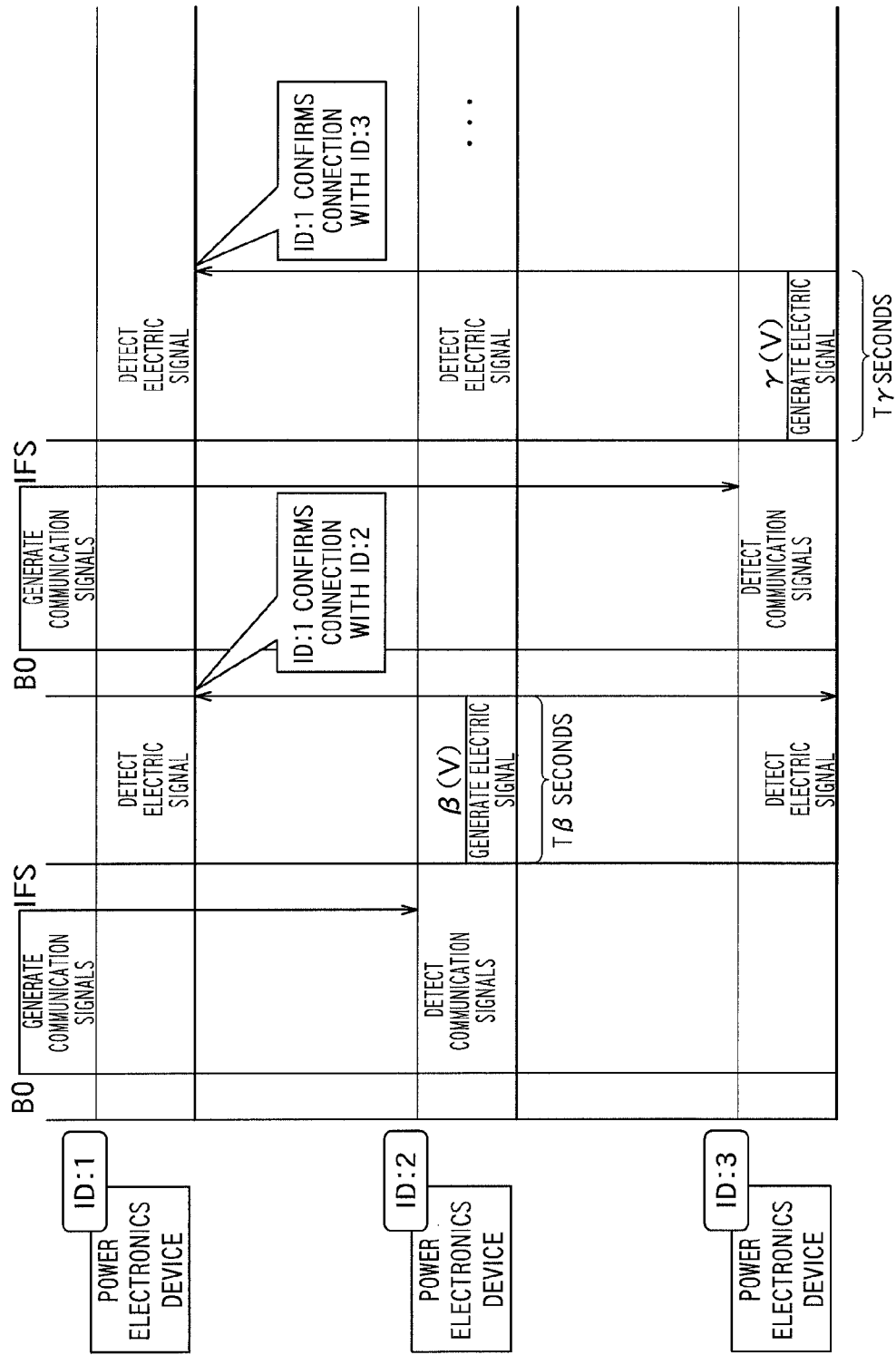
FIG. 18 is a diagram illustrating the dynamic grasping of power line connections according to the embodiment of the present invention.

FIG. 18 shows, as with FIG. 17, the operation sequence regarding the connection detection on the power line, corresponding to the case where physical media to be used are both the power line and the communication line, and the device IDs and the electric signals of the devices are unknown. Note that this sequence is applicable regardless of whether the power electronics devices each include the AIO installed or not.

The power electronics device 1 generates (transmits) a communication signal addressed to the power electronics device 2. At this point, the content of the communication signal designates a device intended to generate an electric signal, and specifies the level of application (β(V)) and the application time (Tβ seconds) of the electric signal that the designated device generates (refer to the connection acknowledgement request message of FIG. 32). Note that the device ID of the designated device may be obtained in advance through communication therewith, or if only a communication address is known, the communication signal may be transmitted to the address without specifying the device ID.

Upon detecting the communication signal from the power electronics device 1, the power electronics device 2 follows the level of application and the application time specified with the communication signal to generate an electric signal of the level (β (V)) for Tβ seconds to the power line. The power electronics device 1 confirms a connection with the power electronics device 2 by detecting the electric signal of the level of application for the application time from the device designated by the power electronics device 1. The power electronics device 1 thereafter confirms also a connection with the power electronics device 3 through the same procedure.

Figure 12:
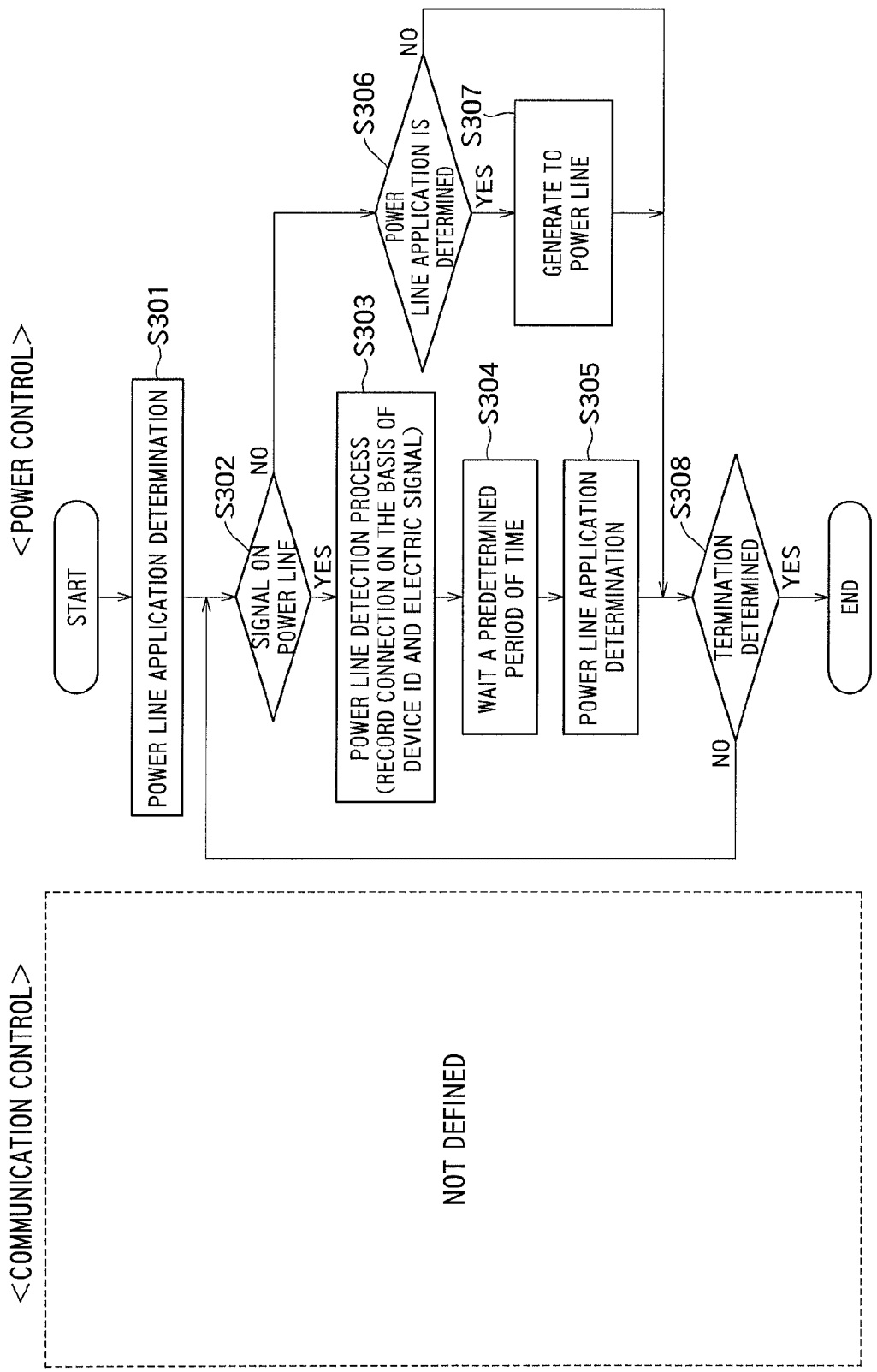
FIG. 12 is a diagram illustrating the dynamic grasping of power line connections according to the embodiment of the present invention.

FIG. 12 is an operation flow chart of the connection detection on the power line using only the power line. This flowchart is applied to the common part of the operation sequences shown in FIG. 14 and FIG. 15, and the illustrations of individual difference operations are omitted. The difference in operation may be added to processes of respective blocks as needed, and maybe performed in an additional manner.

In power line application determination (S301), a device determines whether to generate an electric signal. After the determination, the device determines whether or not the application of an electric signal from another device is detected on the power line (S302). If the electric signal is not generated, the device checks the determination result in step S301, and if the determination result indicates that the device is to perform the application, the device generates an electric signal to notify the existence of the device to the power line (S307). After the application of the electric signal, or if the determination result indicates that the device is not to perform the application, the flow proceeds to step S308, and the device determines whether to terminate the process. If the device determines not to terminate the process, the flow returns to step S302. If determining to terminate the process, the device terminates this process. Note that if the device does not include the AIO installed, the device performs the application after confirming that no electric signal is being generated from another device on the power line, and if the generated electric signal collides with an electric signal from the other device, the device stops generating the electric signal. The device thereafter performs the application again when the flow goes around the loop and reaches this step.

If determining that the electric signal is generated in step S302, the device performs a power line detection process (S303). In the power line detection process, the device records a connection on the basis of the detected electric signal as needed. For example, the device identifies a device ID of a connection destination device on the basis of the level of voltage of the electric signal, and records the connection relationship with the identified device.

The device thereafter waits a predetermined period of time (S304), and performs power line application determination (S305). The device determines whether to terminate the process, and if the device determines not to terminate the process, the flow returns to step S302. If determining to terminate the process, the device terminates this process.

FIG. 13 A and FIG. 13 B are operation flow charts of the connection detection on the power line using both the power line and the communication line.

Figure 13A:
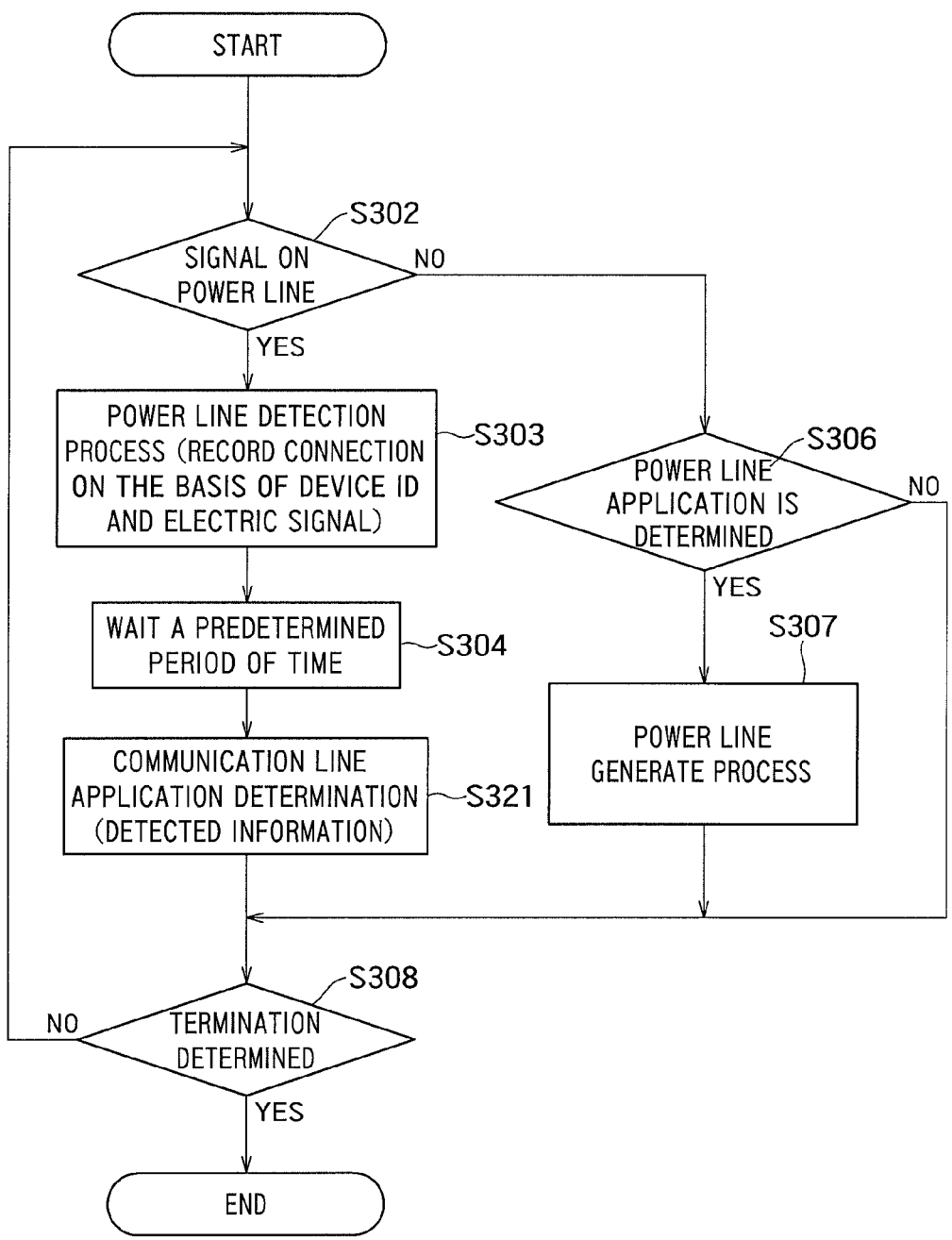
FIG. 13A is a diagram illustrating the dynamic grasping of power line connections according to the embodiment of the present invention.

FIG. 13 A is the flow chart for a power control, and FIG. 13 B is the flow chart for a communication control. These flow charts are applied to the common part of the operation sequences shown in FIG. 16, FIG. 17, and FIG. 18, and the illustrations of individual difference operations are omitted. Note that steps in FIG. 13A similar to those in FIG. 12 are denoted by the same reference numerals.

As shown in the flow chart of FIG. 13B for the communication control, the device determines whether to transmit a communication message from the device, in communication line application determination (S401). The notice information of "communication line application determination (notice information)" in the block of S401 is to specify a message type of the communication, meaning that the device generates a communication message (information on a device ID, an electric signal, or the like) regarding a "connection acknowledgement request" (FIG. 32). This is determined by an application.

The device determines whether or not the communication message is received, with the communicator (S402), and if the communication message is received, the device determines the type of communication information, being a type of the received communication message (S403). The type includes notice information and detected information. The notice information means that the device has received a communication message regarding a "connection acknowledgement request" (information on a device ID, an electric signal, or the like) (FIG. 32), and the detected information means that the device has received a communication message regarding a "connection acknowledgement response" (information on a device ID, an electric signal, or the like) (FIG. 33).

When the type is the notice information, the device records information on a device ID and an electric signal from the other party's device, on the basis of information included in the communication message (power line detection preparation) (S404). On the other hand, when the type is the detected information, the device records a connection relationship with the other party's device on the basis of the detected information on the power line contained in the communication message from the other party's device (power line connection record) (S405). The device thereafter determines whether to terminate the process, after step S404 and step S405 (S412). If the device determines not to terminate the process, the flow returns to step S402. If determining to terminate the process, the device terminates the process.

If determining that no communication message is received, in step S402, the device performs communication line application determination (S406). This is to determine whether to start the transmission of a communication message from the device, as with step S401. If determining to transmit the communication message, the device determines the type (communication line application type) of a communication message that the device transmits (S407). The type includes notice information and detected information. The notice information means that the device is to transmit a communication message regarding a "connection acknowledgement request" (information on a device ID, an electric signal, or the like) (FIG. 32), and the detected information means that the device is to transmit a communication message regarding a "connection acknowledgement response" (information on a device ID, an electric signal, or the like) (FIG. 33).

When the type is the detected information, the device transmits a communication message containing information based on the detection result on the power line (S408). When the type is the notice information, the device transmits a communication message containing information on the device ID and the electric signal of the device (S407). The device ID of a transmission destination may be obtained in advance through communication therewith, or the device may transmit a message having a destination address specified without specifying the device ID. In the latter case, the device may identify the ID of the other party's device using a returned communication message (response). After completing the process of step S407, the device waits a predetermined period of time (S410), and determines whether or not the device is to generate an electric signal, through the power line application determination (S411). The result of the determination is used in the process of the flow chart of FIG. 13A for the power control. Note that if the communication control and the power control are implemented by separate pieces of hardware, a parallel operation of the operation of the flow chart of FIG. 13B for the communication control and the operation of the flow chart of FIG. 13A for the power control is enabled by writing flag information in a form of an application determination (a communication line application determination, and a power line application determination) in a shared memory connected to an internal bus.

As shown in FIG. 13A, the device determines whether or not the application of an electric signal from the other device is detected on the power line (S302). If the electric signal is not generated, the device checks the determination result of step S411 in FIG. 13B, and if the determination result indicates that the device is to perform the application of an electric signal, the device generates an electric signal to notify the existence of the device to the power line (S307). After the application of the electric signal, or if the determination result indicates that the device is not to perform the application of the electric signal, the flow proceeds to step S308, and the device determines whether to terminate the process. If the device determines not to terminate the process, the flow returns to step S302. If determining to terminate the process, the device terminates the process.

If determining that the electric signal is generated in step S302, the device performs the power line detection process (S303). In the power line detection process, the device records a connection on the basis of a detected electric signal as needed. For example, the device identifies a device ID of a connection destination device on the basis of the level of voltage of the electric signal, and records the connection relationship with the identified device.

The device thereafter waits the predetermined period of time (S304), and determines whether or not the device itself is to transmit a communication message, through communication line application determination (S321). The detected information of "communication line application determination (detected information)" in the block of step S321 is to specify a message type of the communication, meaning that the device feeds back the detection result on the power line to another device using the communication line. The device thereafter determines whether to terminate the process. If the device determines not to terminate the process, the flow returns to step S302, and if determining to terminate the process, the device terminate this process.

Note that, instead of the above-described ID for each device, when a system configured by a plurality of power electronics devices in connection relationships through the power line/communication line is dynamically determined, an ID (a specific identifier) unique in the system may be assigned. When the connection relationship is updated (e.g., the addition of a new device, or the separation of an existing device), the ID are updated. It is thereby possible to enhance the convenience of management viewed from a senior operator. There is a design support tool for electricity infrastructure, generally called SCL (System Configuration Language). This displays design information that an operator has manually created in advance so as to improve operating efficiency, and using the above-described method of dynamically grasping system configuration enables dynamic assisting in working/operating scenes.

In addition, these methods of dynamically grasping power line connections are applicable to, as one example, the case where a device connected to a DC system (power line) actively generates/detects an electric signal to the power line, or the case where a device connected to an AC system (power line) generates/detects an electric signal to the power line in the event of a power failure of a power system or a generator that is a driving source of the device. However, the present embodiment is not limited to these cases.

In addition, instead of generating/detecting electric signals, pluralities of power electronics devices that detect electric signals (voltage/current/frequency) falling within a predetermined range may be determined to be on the same power line, by exchanging pieces of electrical signal information detected by the power electronics device using communication messages.

FIG. 19A, FIG. 19B, FIG. 19C, and FIG. 19D present the example of master/slave configuration determination in a system in which a plurality of power electronics devices are installed. The order of master/slave determination is not necessarily the same order every time because the master/slave determination is performed in the case where the existence of another device is discovered in a communication network or an electricity network. In the example of the drawings is shown how configuration determination is performed over four times until the pieces of master/slave configuration information of all the four power electronics devices are identical.

Figure 19A:
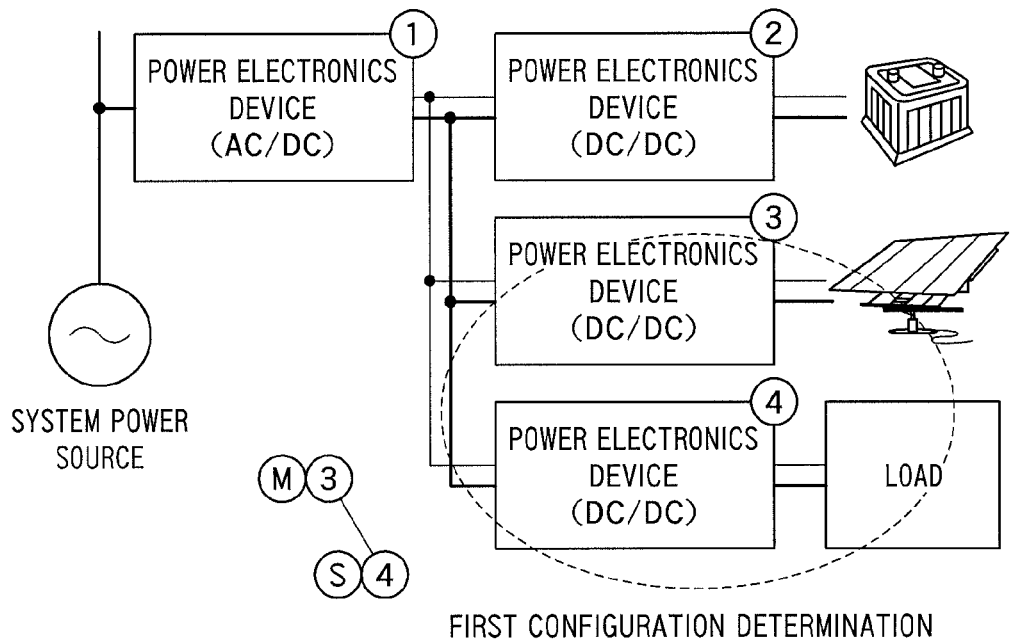
FIG. 19A is a diagram showing the example of how to determine the configuration of a plurality of power electronics devices according to the embodiment of the present invention.
Figure 19B:
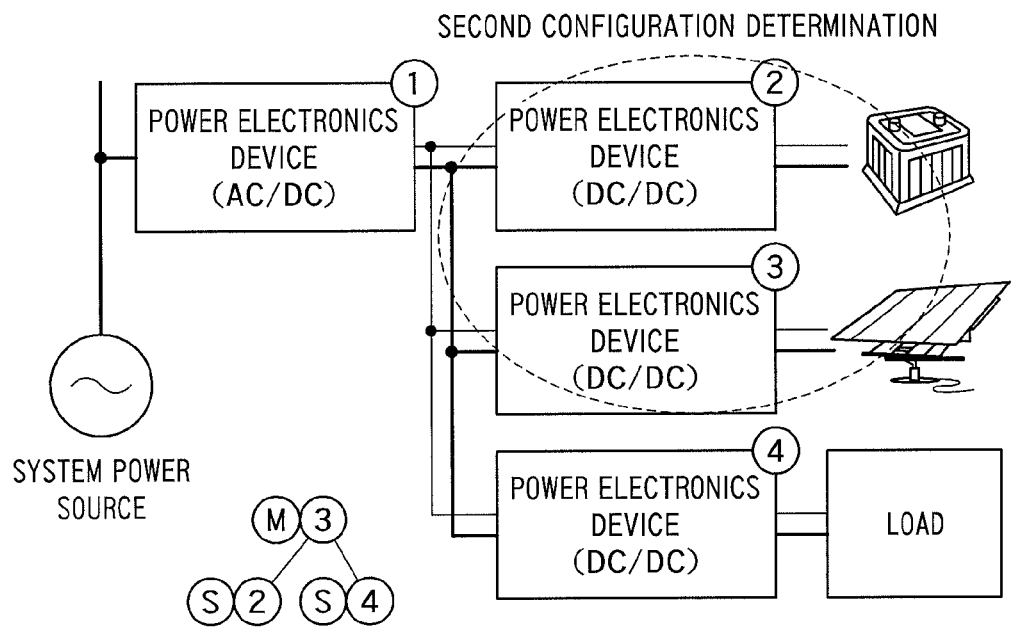
FIG. 19B is a diagram showing the example of how to determine the configuration of a plurality of power electronics devices according to the embodiment of the present invention.
Figure 19C:
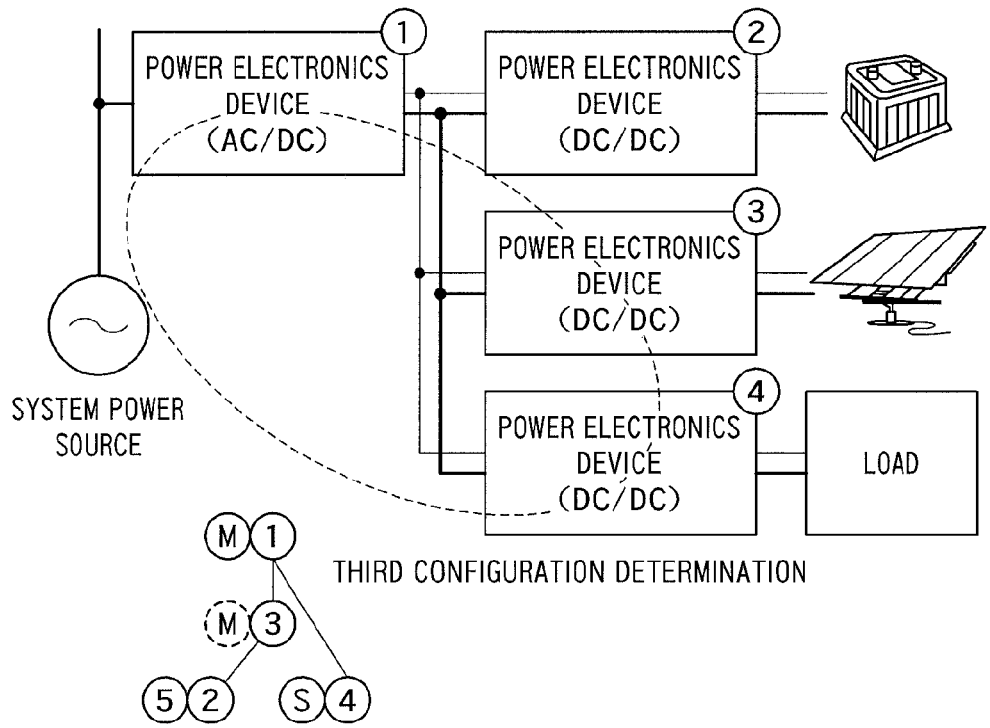
FIG. 19C is a diagram showing the example of how to determine the configuration of a plurality of power electronics devices according to the embodiment of the present invention.
Figure 19D:
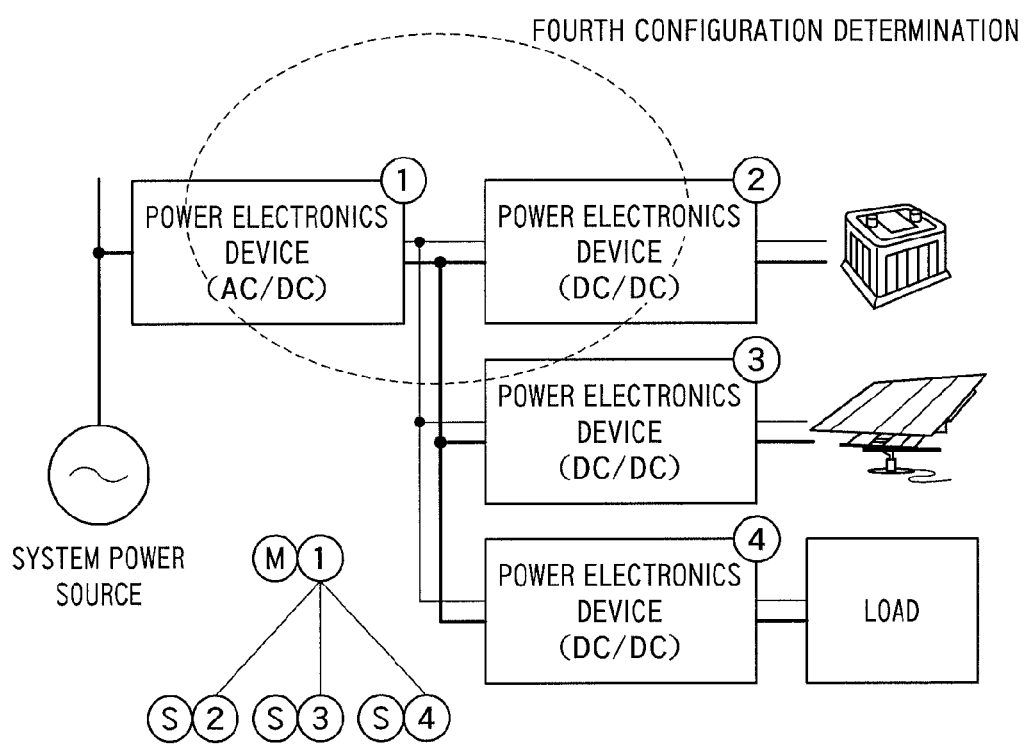
FIG. 19D is a diagram showing the example of how to determine the configuration of a plurality of power electronics devices according to the embodiment of the present invention.

The configuration determination is performed among three power electronics devices (DC/DC) in the first configuration determination shown in FIG. 19A, and in the second configuration determination shown in FIG. 19B. A power electronics device (AC/DC) starts the configuration determination with the three power electronics devices from the third configuration determination shown in FIG. 19C. After the third configuration determination, a plurality of masters being control entities exists in the system. In the example of the drawings, the conflict over power monitoring controls does not occur because each of the power electronics devices to be slaves does not have a plurality of masters, which therefore arises no problem even if the system is permitted to switch to a regular operation in this state. However, the logical hierarchy configuration thereof is made multistaged from the power electronics device (AC/DC) as the highest master to the power electronics devices (DC/DC) as the lowest slaves, which problematically reduce the efficiency of information transmission. Actually, in the example of the drawings, it is preferable that the system takes a directly-connected logical hierarchy configuration shown in the fourth configuration determination of FIG. 19D because there are both the communication line connection and the power line connection between the one power electronics device (AC/DC) and the three power electronics devices.

Figure 20:
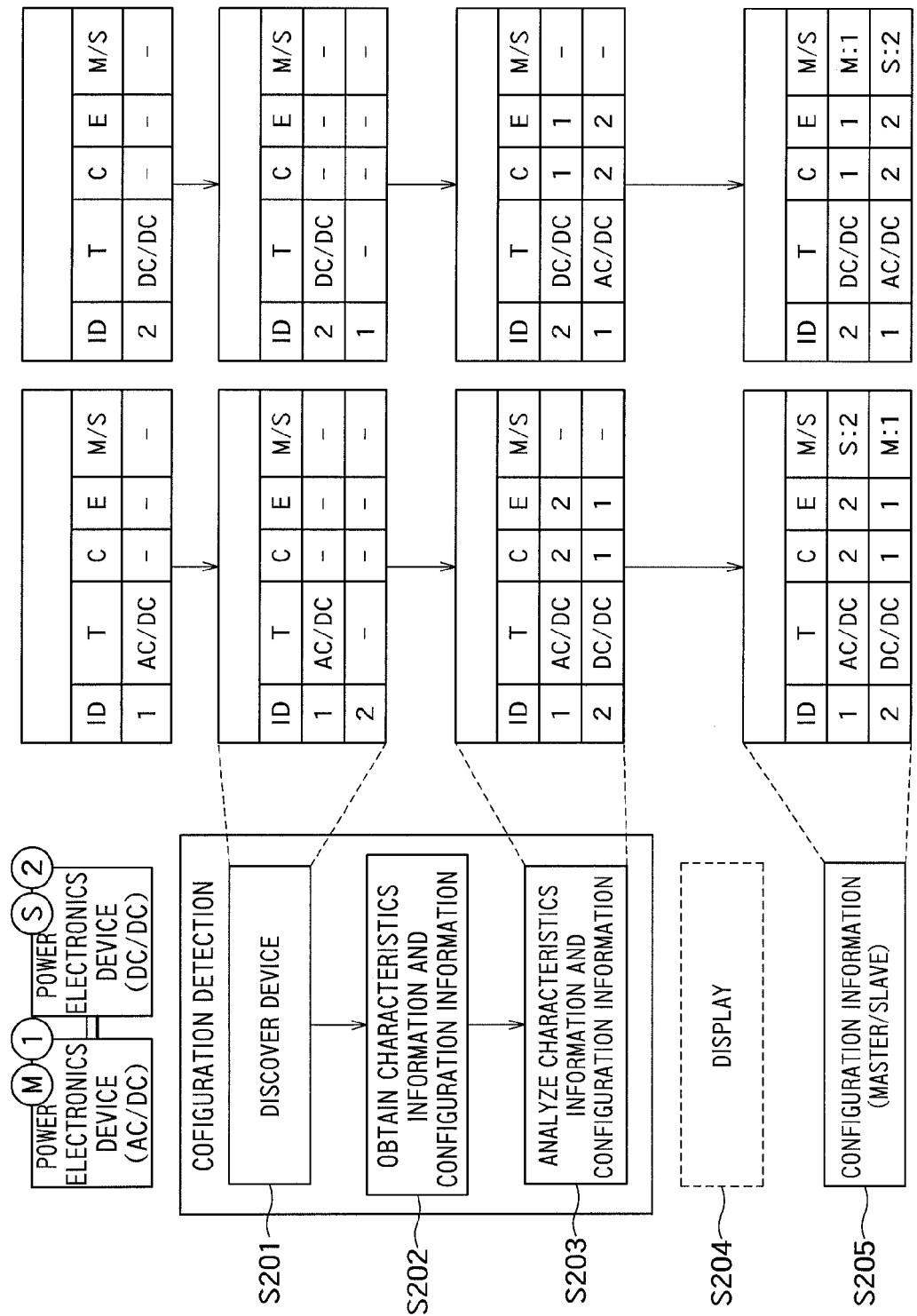
FIG. 20 is a diagram showing the example of how to determine the configuration of a plurality of power electronics devices according to the embodiment of the present invention.

FIG. 20 shows how the exchange of characteristics information and configuration information, and the configuration determination are performed, and the configuration information is updated after the master/slave determination, under the assumption that there are two devices of a power electronics device (AC/DC) and a power electronics device (DC/DC) installed in the system. The right portion of the drawing shows how the pieces of configuration information on the devices are changed, a field "T" represents a conversion characteristic, a field "C" represents an ID of another party's device having a connection in terms of communication, a field "E" represents an ID of another party's device having a connecting in terms of power, and a field "M/S" represents a device ID to be a master or a slave for the device.

A device detects another device on the same power line in device discovery (S201), obtains characteristics information and configuration information on the discovered device in step S202, and reflects the information obtained from the other device to the configuration information of the device in step S203. Note that it is conceivable that a step of performing connection confirmation on the communication/power line is interposed between step S202 and step S203. In step S204, the master/slave configurations are displayed on each device and the operator checks whether or not the master/slave configurations are identical. As an alternative method, as described above, an operation sequence may be automatically executed in which whether the master/slave configuration grasped by the device is identical to the master/slave configuration grasped by the other party's device or not is confirmed. If it is checked that the configurations of the devices are identical, the master/slave configuration is determined with this content, and the configuration information is updated (S205). In this update, a sequence number is incremented. In the case where there are three or more of the devices, as shown in the operation flow charts of FIG. 9A and FIG. 9B, or shown in FIG. 19A and FIG. 19B, whether or not a device of which configuration determination is to be compared already has a master is confirmed.

Figure 21A:
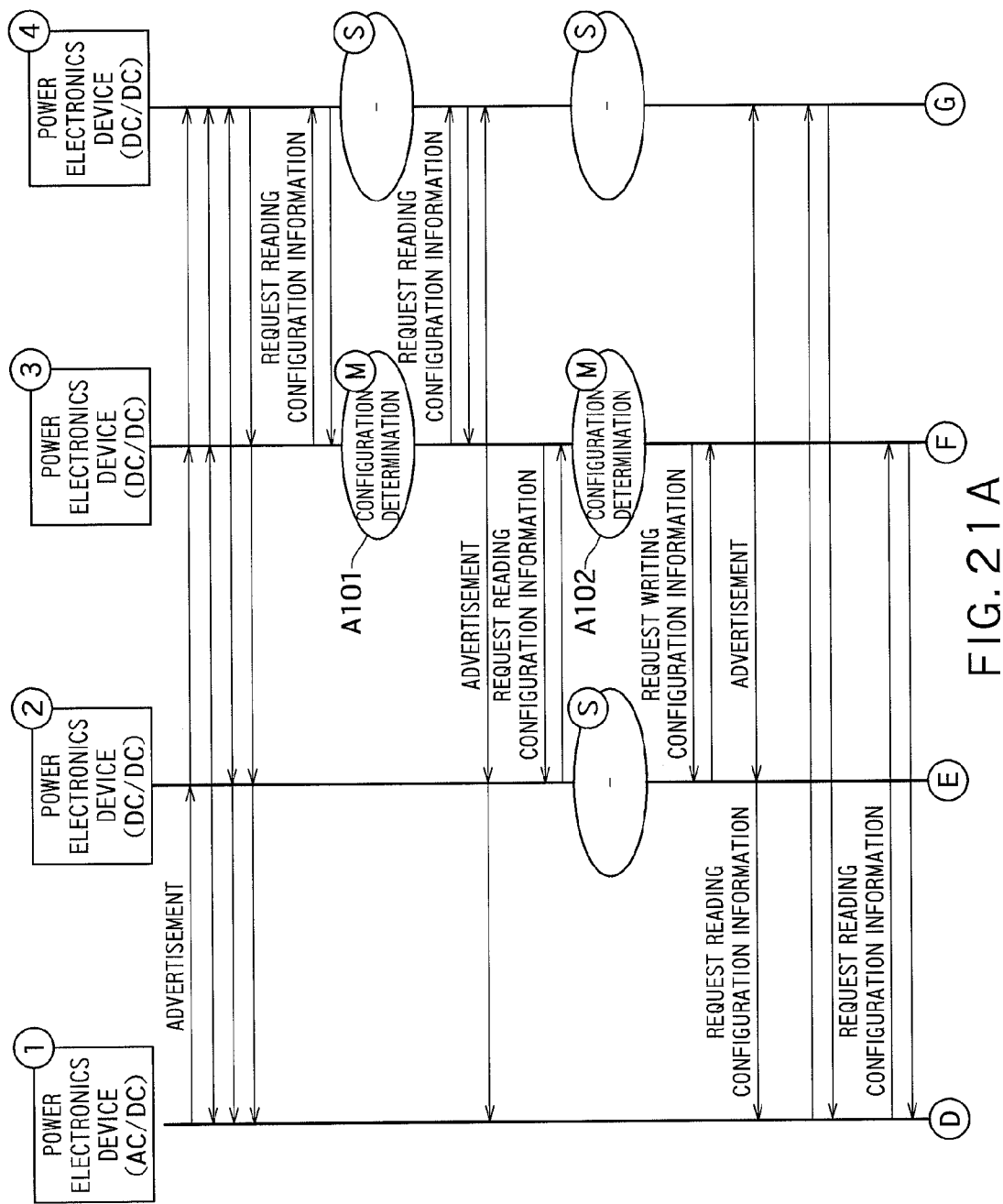
FIG. 21A is an operation sequence diagram of a plurality of power electronics devices according to the embodiment of the present invention.
Figure 21B:
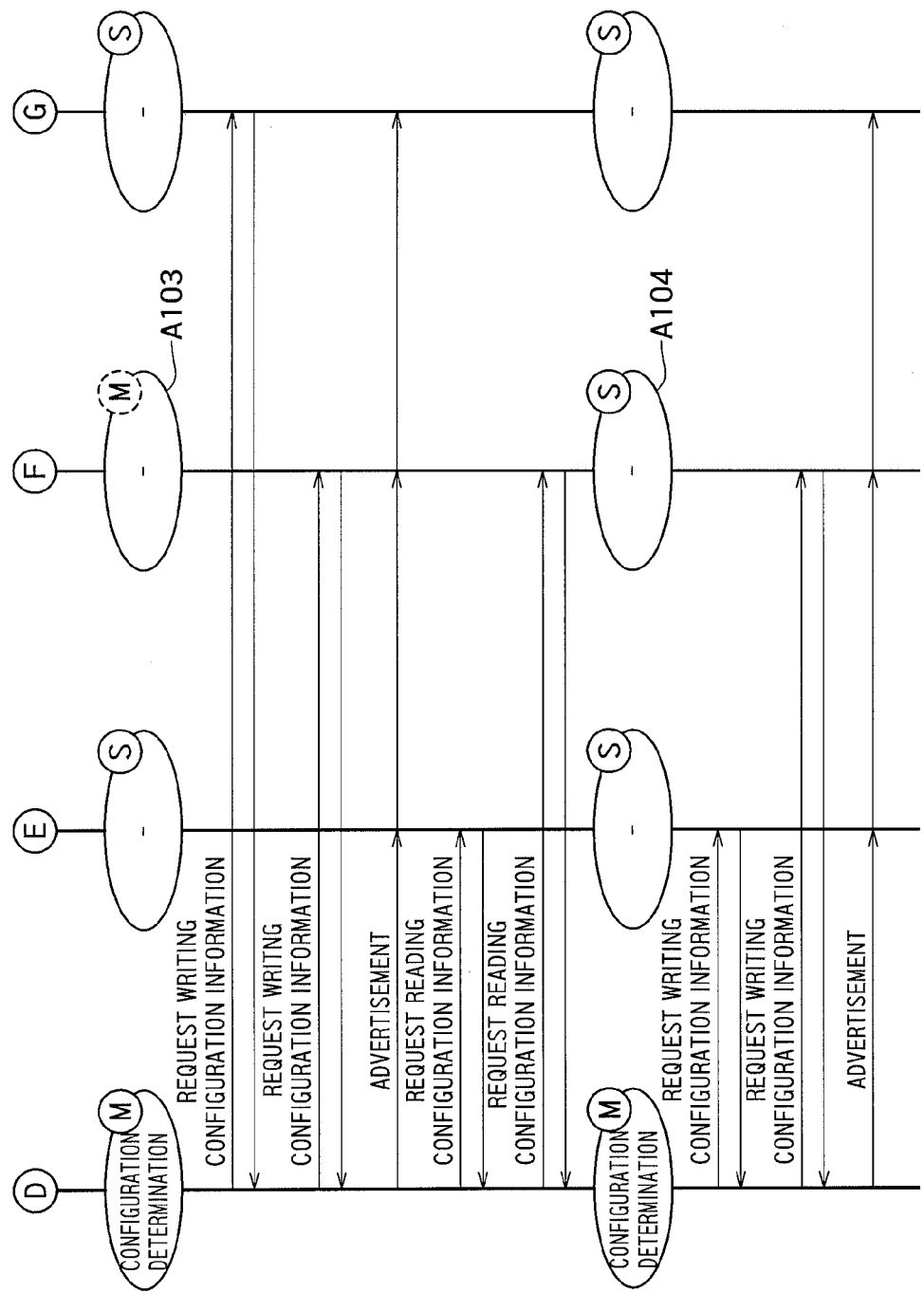
FIG. 21B is an operation sequence diagram of a plurality of power electronics devices according to the embodiment of the present invention.

FIG. 21A and FIG. 21B present an example of an operation sequence among a plurality of power electronics devices in the embodiment of the present invention. These drawings show in detail an operation in which the communication messages are actually exchanged in the system configuration of FIG. 19. The configurations and details of the communication messages to be exchanged are presented in FIG. 25, FIG. 26, FIG. 27, FIG. 28, FIG. 29, FIG. 30, and FIG. 31.

The power electronics device exchanges, in order to discover another device, using the communication network, an advertisement message (to notify notification/update/separation) of FIG. 25, a search request message (to inquire the existence of another device) of FIG. 26, and a search response message (being a response to the search request message, to notify the existence of the device) of FIG. 27. In addition thereto, the discovery of another device may be performed, as described above, by utilizing the information on the electricity network (confirmation that the other device is connected on the same bus), or by manually setting by an operator. These communication messages each contain a communication header for TCP/IP (Transmission Control Protocol/Internet Protocol), UDP/IP (User Datagram Protocol/Internet Protocol), or the like, and information on a message type to distinguish the message, as well as a device ID of a transmission source, and information on a waiting time until responding with the search response message after receiving the search request message.

Figure 28:
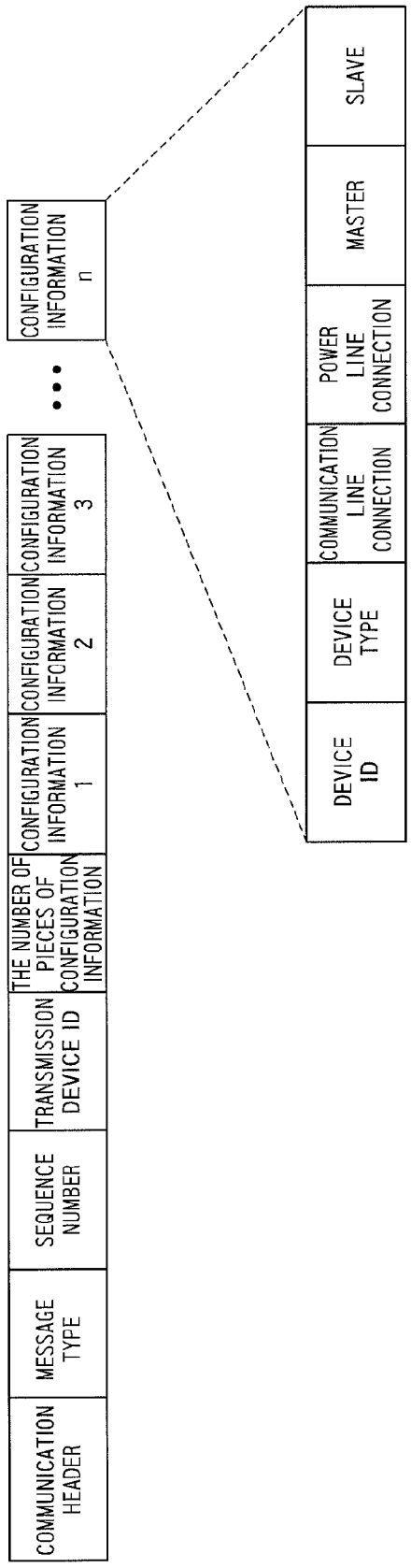
FIG. 28 is a diagram showing a configuration example of the communication message according to the embodiment of the present invention.

Actual characteristics information and configuration information are exchanged among the devices using the configuration information writing request message of FIG. 28, the configuration information writing response message of FIG. 29, the configuration information reading request message of FIG. 30, and the configuration information reading response message of FIG. 31.

The relationship between the characteristics information and the configuration information is, as presented in FIG. 7 and FIG. 8, the difference between individual information or an aggregate of a plurality of pieces of information. However, besides the method in which pieces of characteristics information on a plurality of devices are collectively delivered as configuration information (in a table form) as shown in the communication message forms of FIG. 28 and the like, a method is possible in which pieces of characteristics information of individual devices are individually delivered. In the embodiment of the present invention, the method of distributing the information is not limited to particular methods. For each device, the configuration information contains a device ID, a device type, a communication line connection, a power line connection, and a master/slave, among which the communication line connection, the power line connection, and the master/slave can be expressed in the form of a plurality of array elements in some cases.

FIG. 21C(A) to (E) show how master/slave information in the configuration information on a power electronics device having a device ID of 4 is updated in the operation sequence of FIG. 21A and FIG. 21B. FIG. 21C(A) shows initial configuration information, and FIGS. 21C(B), (C), (D), and (E) show pieces of configuration information updated in master/slave determinations A101, A102, A103, and A104 in the operation sequence. Specifically, the pieces of configuration information are written between the power electronics device 3 and 4 in the master/slave determination A101, between the power electronics devices 2 and 3 in the master/slave determination A102, between the power electronics devices 1, 3, and 4 in the master/slave determination A103, and between the power electronics devices 1, 2, and 3 in the master/slave determination A104. The pieces of configuration information of FIG. 21C(B), FIG. 21C(C), FIG. 21C(D), and FIG. 21C(E) are shared in respective determinations.

Figure 22A:
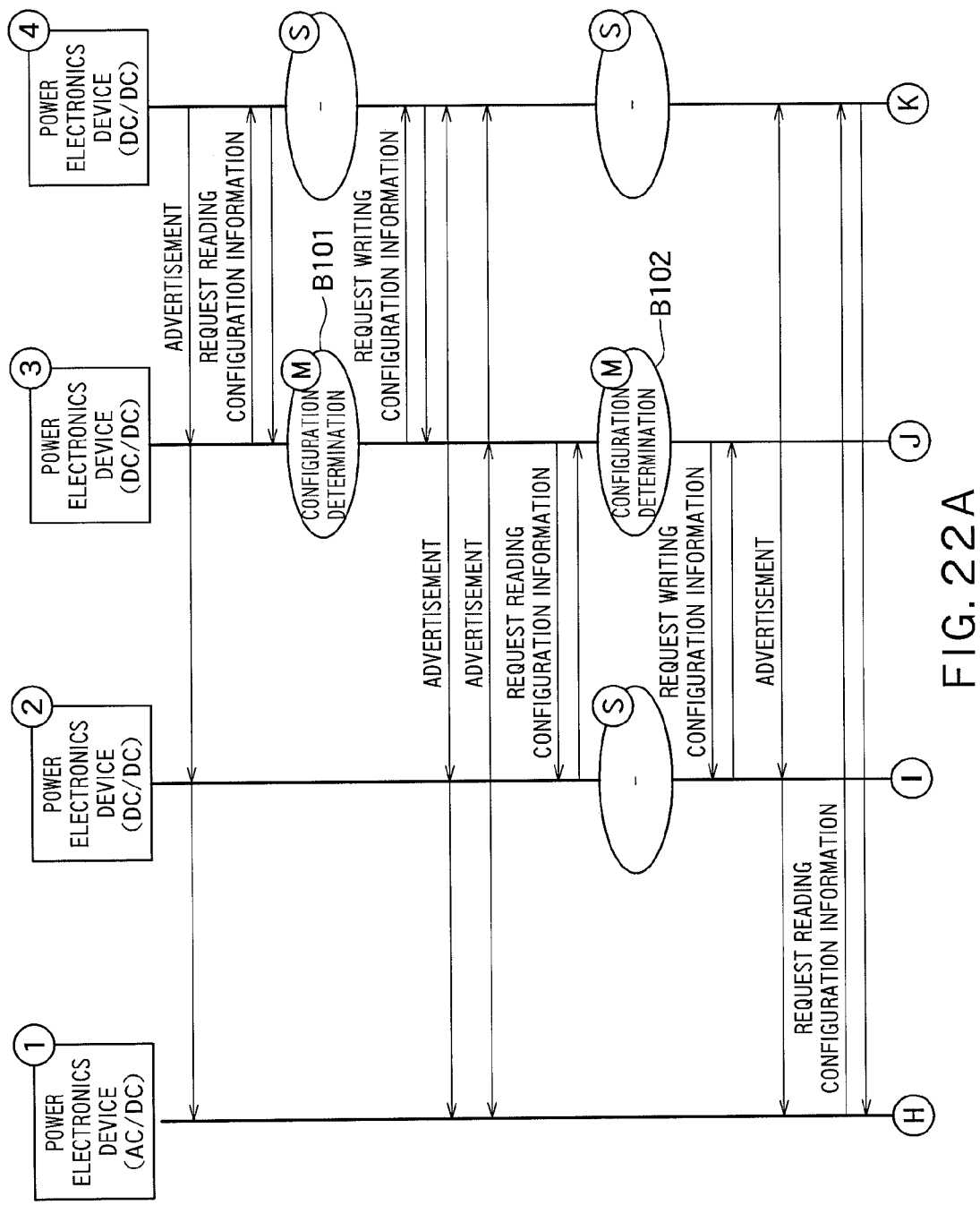
FIG. 22A is an operation sequence diagram of a plurality of power electronics devices according to the embodiment of the present invention.
Figure 22B:
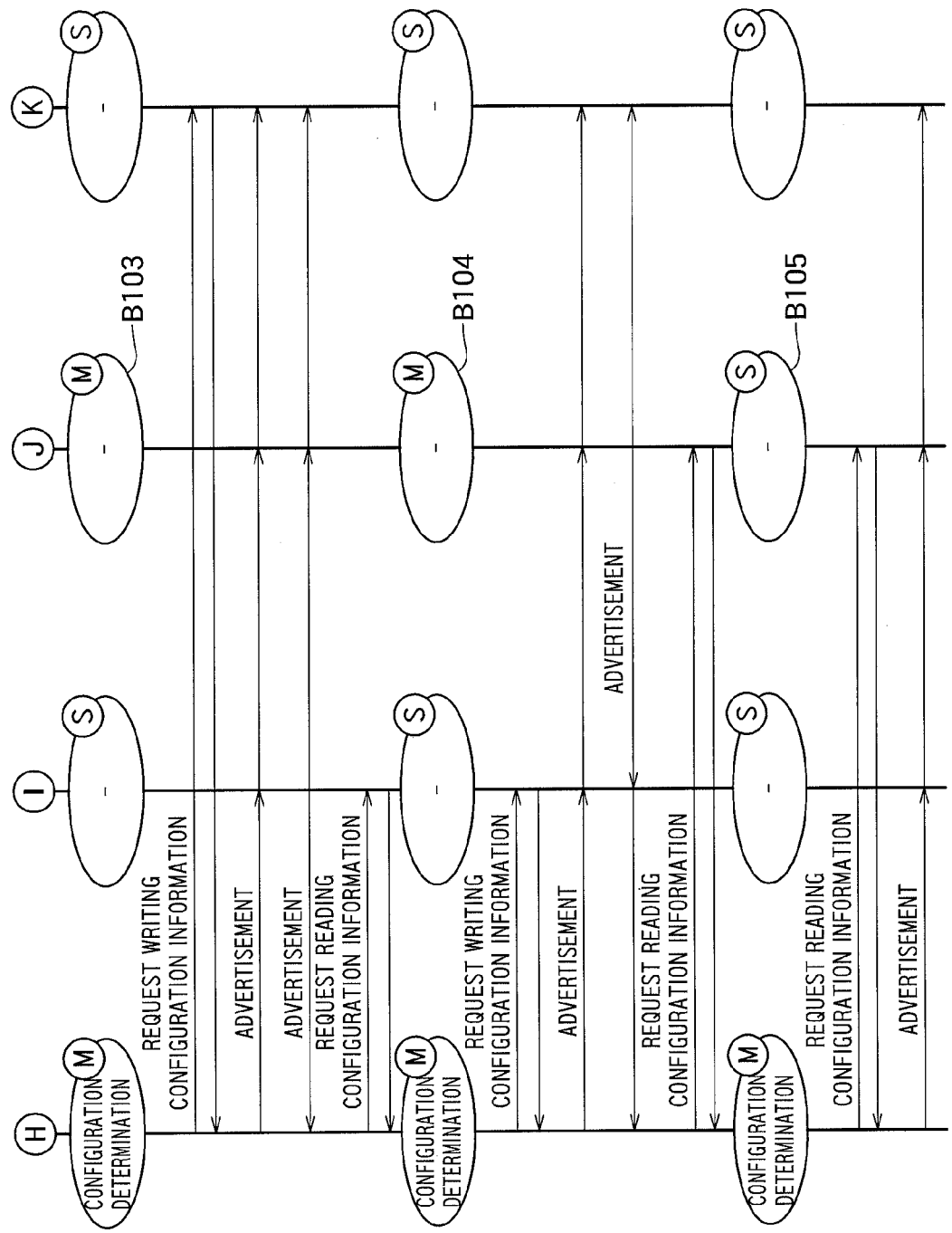
FIG. 22B is an operation sequence diagram of a plurality of power electronics devices according to the embodiment of the present invention.

FIG. 22A and FIG. 22B present another example of an operation sequence among a plurality of power electronics devices in the embodiment of the present invention. FIG. 22C(A) to (F) show how master/slave information in the configuration information on a power electronics device having a device ID of 4 is updated in the operation sequence of FIG. 22A and FIG. 22B. FIG. 22C(A) shows initial configuration information, and FIGS. 22C(B), (C), (D), (E), and (F) show pieces of configuration information updated in master/slave determinations B101, B102, B103, B104, and B105 in the operation sequence. Specifically, the pieces of configuration information are written between the power electronics devices 3 and 4 in the master/slave determination B101, between the power electronics devices 2 and 3 in the master/slave determination B102, between the power electronics devices 1 and 4 in the master/slave determination B103, and between the power electronics devices 1 and 2 in the master/slave determination B104. The pieces of configuration information of FIGS. 22C(B), (C), (D), and (E) are shared in respective determinations.

The difference between the sequence of FIG. 21A and FIG. 21B, and sequence of FIG. 22A and FIG. 22B is as follows. In FIG. 21A and FIG. 21B, the power electronics devices each recognize the existences of all the power electronics devices in the system (the devices each notify the existence of the device to one another with the advertisements in the first four sequences of FIG. 21A), and thereafter start the exchange of the characteristics information/configuration information for master/slave construction, and the configuration determination. In FIG. 22A and FIG. 22B, the power electronics devices each recognize the existences of the individual other power electronics devices while starting the exchange of the characteristics information/configuration information for the master/slave construction, and the configuration determination. For example, in FIG. 22A, a device 3 receives an advertisement from a device 4 and recognizes the device 4 while starting the exchange of the information and the configuration determination.

As described above, the device IDs are the information to uniquely distinguish the devices. When communication addresses including IP addresses are used as the IDs, a device obtains characteristics information/configuration information from another power electronics device, while accessing other power electronics devices in the system written in the information. On the other hand, in the case where values other than the communication addresses are used as the device IDs, a device cannot access another power electronics device in the system only by obtaining the characteristics information/configuration information. Thus, the repetitive obtaining characteristics information/configuration information as described above (FIG. 22A and FIG. 22B) is suspended. The sequence of FIG. 21A and FIG. 21B and the sequence of FIG. 22A and FIG. 22B finally produce the same master/slave configuration information, but have different procedures for the configuration determination to produce the configuration information.

Figure 23:
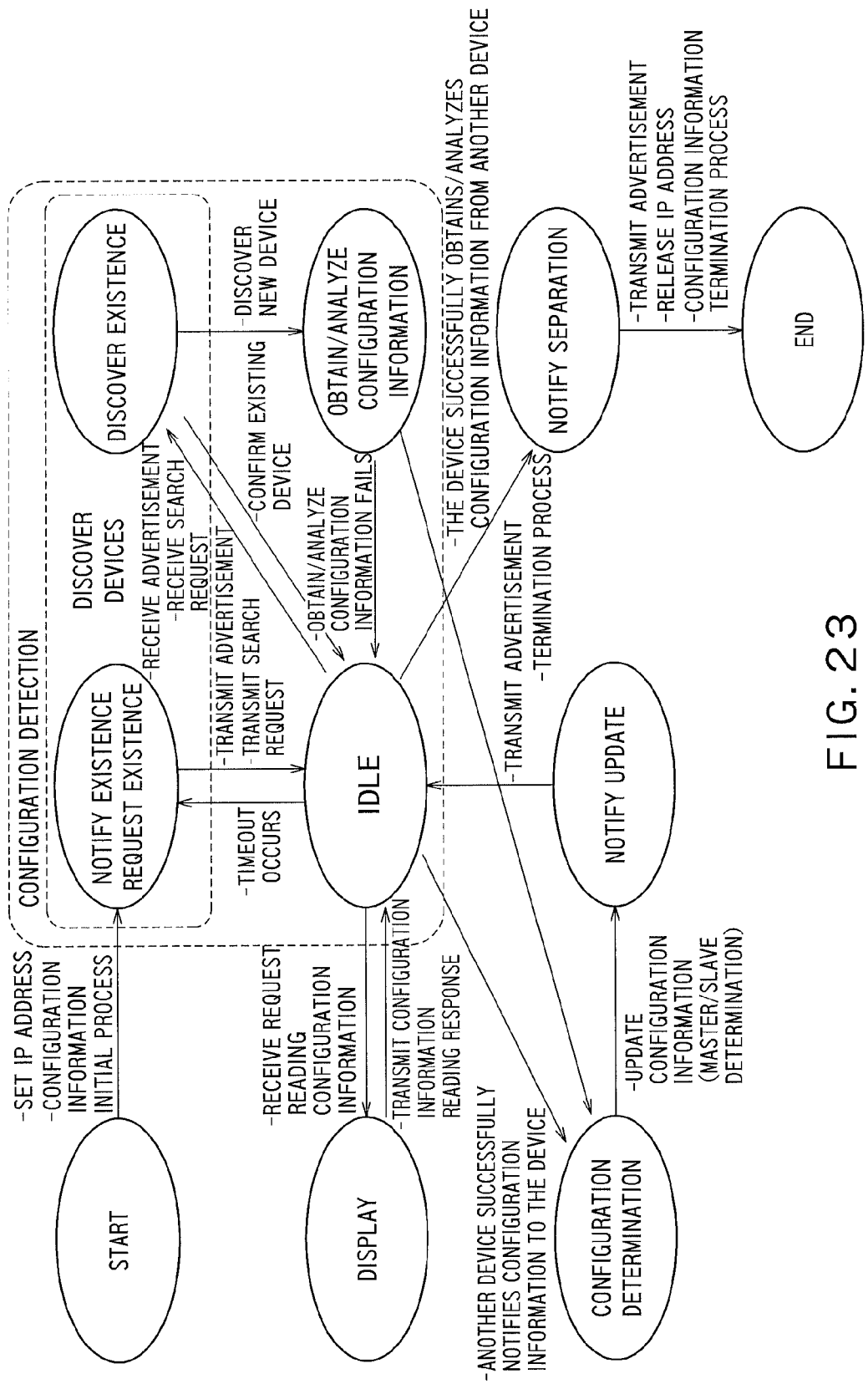
FIG. 23 is an internal state transition diagram of the power electronics device according to the embodiment of the present invention.

FIG. 23 is a state transition diagram about the configuration determination performed in the power electronics device in the embodiment of the present invention. Ellipses with written characters in the drawing each represent a state of the device. Event names with arrows each represent the occurrence of an event, and the state transitions every occurrence of event. The device starts with a state of "start" and ends with a state of "end." Possible states therebetween include "notify existence/request existence," "IDLE," "discover existence," "obtain/analyze configuration information," "determine configuration," "display," "notify update," and "notify separation."

For example, when turning on a power source brings the device into the state of "start," the device performs an IP address setting and a configuration information initial process (initial setting of configuration information) to transition to the state of "notify existence/request existence." When transitioning to this state, the device transmits an advertisement or a search request to transition to the state of "IDLE." Upon receiving an advertisement or a search response in the state of "IDLE," the device transitions to the state of "discover existence," and when discovering a new device, the device transitions to the state of "obtain/analyze configuration information." After obtaining and analyzing the configuration information, the device transitions to the state of "determine configuration." After confirming that the master/slave configuration of the device is identical to that of another device, the device updates the configuration information to transition to the state of "notify update," and transmits the updated information to the other device to return to the state of "IDLE." Here shows one example of the state transition between some states, and other states similarly transition in response to events.

Figure 24A:
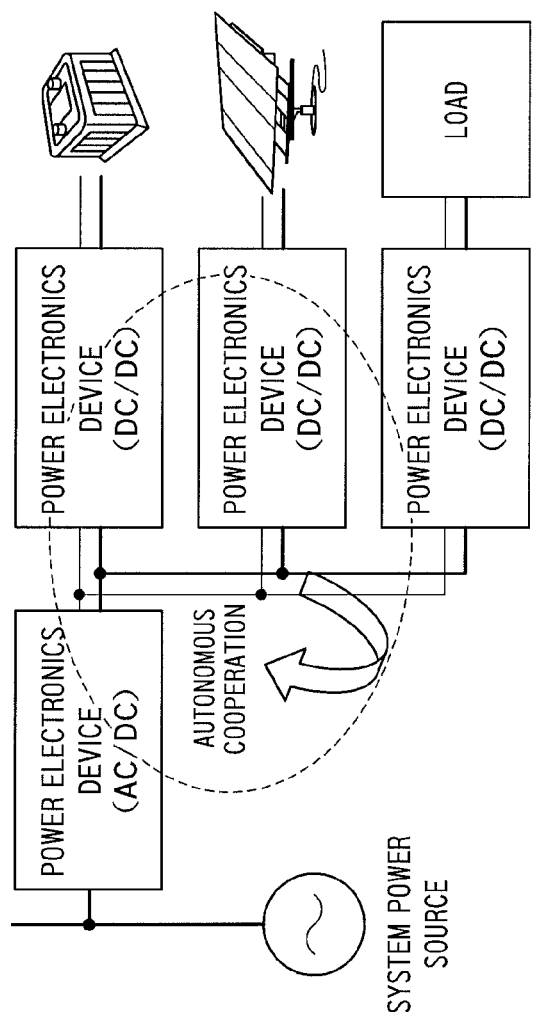
FIG. 24A is a diagram showing the example of how to determine the configuration of the plurality of power electronics devices according to the embodiment of the present invention, in the occurrence of abnormality.
Figure 24B:
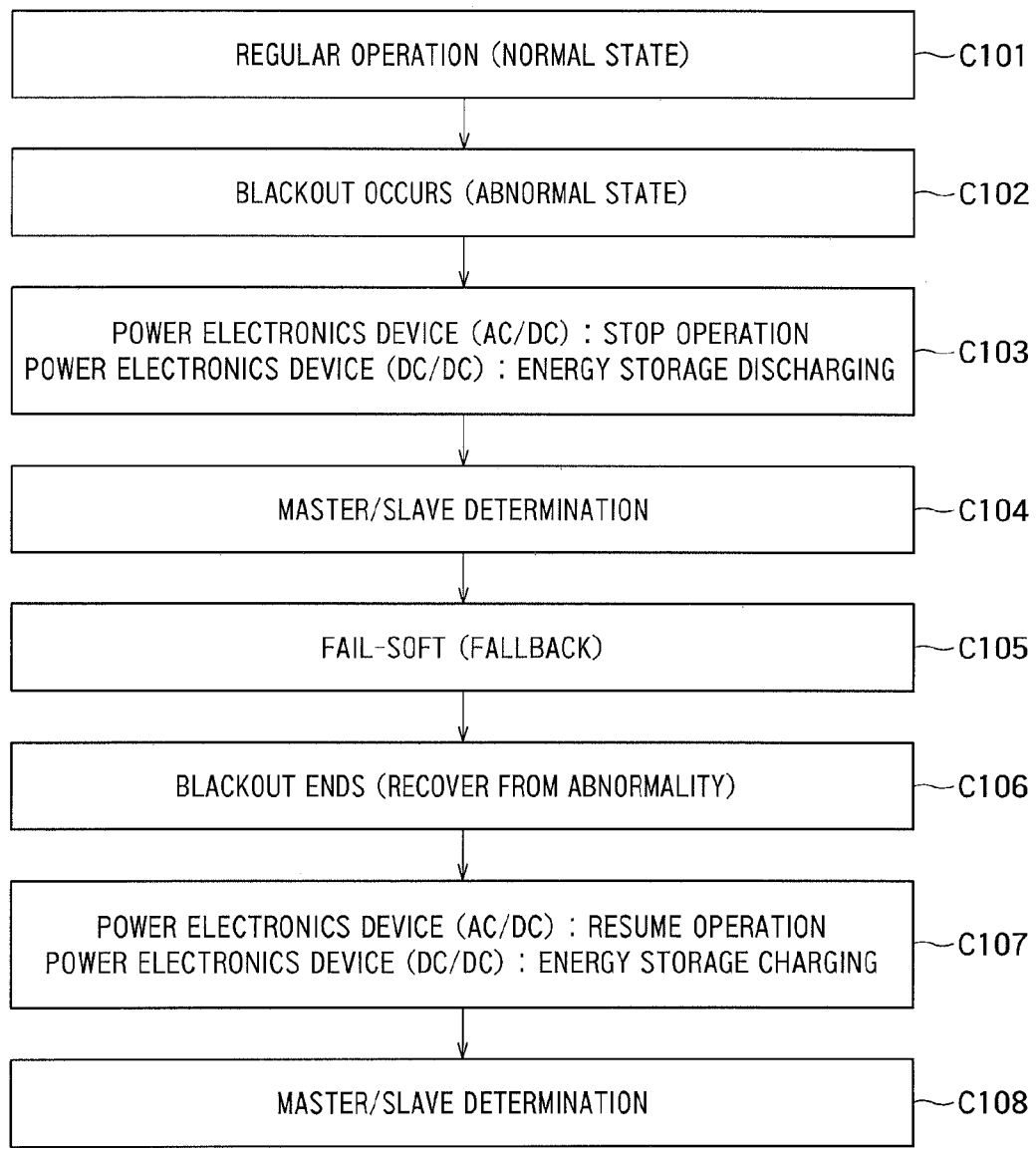
FIG. 24B is a diagram showing the example of how to determine the configuration of the plurality of power electronics devices according to the embodiment of the present invention, in the occurrence of abnormality.

The operation from the state of start is described in FIG. 23, and the embodiment of the present invention is applicable not only to the initial installation, but also applicable to the occurrence of abnormality in a similar manner. Specifically, assume implementing fail-soft (fallback) in the event where an abnormality occurs due to a single failure in a power line (a power system network to be a provider side), in the "autonomous cooperation: starting from blackout" of FIG. 5C. FIG. 24A, FIG. 24B, and FIG. 24C are diagrams illustrating the operation of the devices in the occurrence of abnormality. FIG. 24A is a connection configuration diagram showing the state where the power electronics devices are in autonomous cooperation in a normal time. FIG. 24B is an operation flow chart in the occurrence of abnormality. FIG. 24C is a diagram showing outputting statuses of the power electronics devices at each stage in the flowchart of FIG. 24B.

In the regular operation, a power electronics device (AC/DC) operates while receiving power supply from a system power source, and power electronics devices (DC/DC) operate while receiving the power supply from the system power source via the power electronics device (AC/DC), as well as receiving power supply from power sources including an energy storage/PV (C101). The outputs (actual values) of the power electronics devices in the normal operation are shown in the first table of FIG. 24C. The table also shows rated values of the power electronics devices.

In the event of blackout (C102), the power electronics device (AC/DC) stops operating (C103). In addition, the power electronics device (AC/DC) typically monitors the power line, and performs fail-safe (shutdown) if the actual values such as a voltage and a frequency exceed respective threshold values. Since the power electronics devices (DC/DC) operate, as described above, while receiving the power supply from the system power source via the power electronics device (AC/DC), as well as receiving the power supply from the power sources including the energy storage/PV, they can continue operating and communication in the blackout, by switching power systems thereof to drive. The power electronics devices (DC/DC) are not directly connected to an AC side, and therefore do not perform the above fail-safe. The power electronics devices (DC/DC) connected to the energy storage and the generator prepare for discharging at this point. The outputs of the power electronics devices in the event of blackout are shown in the second table of FIG. 24C. The power electronics device (AC/DC) and the power electronics device (DC/DC): load, which operate until then now stop operating due to the blackout. The power electronics devices (DC/DC) can detect the blackout in the power electronics device (AC/DC) through, for example, the shutdown of communication with the power electronics device (AC/DC).

Next, when the power electronics device (AC/DC) is brought into fail-safe, the remaining devices determine the master/slave (C104). For fail-soft (fallback), a priority criterion is adopted with which a power electronics device having greatest likelihood of being alive in an abnormal case is selected as a master. That is, among the power electronics devices (DC/DC), a device connected to the power source is determined as a master in preference to a device connected to a load. Furthermore, with respect to the power sources, a power electronics device (DC/DC) connected to an energy storage takes precedence over a power electronics device (DC/DC) connected to a renewable energy generator.

When the master/slave is determined, these devices are brought into fail-soft (fallback) (C105). The outputs of the power electronics devices in the fail-soft are shown in the third table of FIG. 24C. Power is output from the energy storage and the generator, which do not output power until then, and the load is driven on the power. However, the power electronics device (AC/DC) remains stopped.

When the blackout ends (C106), the power electronics device (AC/DC) resumes operating (C107), and the power electronics devices (DC/DC) connected to the energy storage and the generator prepare for charging from discharging of the energy storage. The outputs of the power electronics devices in resuming the operation are shown in the bottommost table of FIG. 24C. The devices including the restored power electronics device (AC/DC) thereafter perform the master/slave determination (C108), and return to the regular operation. The outputs of the power electronics devices also recover to those shown in the first table of FIG. 24C.

Since the relationships of the communication line connections and the power line connections in the system may change in the occurrence of abnormality, it is preferable to perform the process of dynamic grasping of the connection relationships.

In the regular operation after the configuration determination is completed, the devices exchange communication messages regarding a real time control/non-real-time control with one another, to perform a monitoring control to the power. For example, information for monitoring includes a current value of active power (W), a current value of reactive power (VAR), a unit voltage per phase, and a current value of power factor. In addition, information for controlling includes permission to connect to the electricity network, permission to use of PV output, permission to use of energy storage output, permission to use of a active power/reactive power control, a target value of active power (W), a target value of reactive power (VAR), a target value of power factor, a value of output level of active power (%), a value of output level of reactive power (%), and a value of frequency. Furthermore, rated information includes a rated active power (W), a rated apparent power (VA), and a rated reactive power (VAR). As a possible general embodiment, control information can be both read and written, and monitored/rated information can be only read.

As described above, according to the embodiment of the present invention, in the initial installation of power electronics device or in the occurrence of abnormality after starting the operation, the plurality of devices automatically change logical configurations and grasp the connection relationships in the system, which increases the throughput of the power input/output while securing the flexibility of the operation.

The power electronics device as described above may also be realized using a general-purpose computer device as basic hardware. That is, each block of in the power electronics device can be realized by causing a processor mounted in the above general-purpose computer device to execute a program. In this case, the power electronics device may be realized by installing the above described program in the computer device beforehand or may be realized by storing the program in a storage medium such as a CD-ROM or distributing the above described program over a network and installing this program in the computer device as appropriate. Furthermore, the storage may also be realized using a memory device or hard disk incorporated in or externally added to the above described computer device or a storage medium such as CD-R, CD-RW, DVD-RAM, DVD-R as appropriate.

Furthermore, the power electronics device may include a CPU (Central Processing Unit), a ROM (Read Only Memory) and a RAM as one example of circuitry. In this case, each unit or each element in the power electronics device can be controlled by a CPU's reading out into a RAM and executing a program which is stored in a storage or ROM.

Also, the above-stated hardware configuration is one example and a part or all of the power electronics device according to an embodiment can be realized by an integrated circuit such as a LSI (Large Scale Integration) or an IC (Integrated Circuit) chip set as one example of circuitry. Each function block in the power electronics device can be realized by a processor, individually, or a part or all of the function blocks can be integrated and realized by one processor. A means for the integrating the part or all of the function blocks is not limited to the LSI and may be dedicated circuitry or a general-purpose processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:
1. A power electronics device comprising:
a connector connected to a power line;
a power controller that performs at least one of generating an electric signal to the power line and detecting an electric signal on the power line via the connector;
a connection detection processor that performs a connection detection process with use of the power controller to detect another power electronics device connected to the power line; and
a collision monitor that monitors whether or not collision of electric signals occurs on the power line during the connection detection process and controls the connection detection processor according to a monitoring result of whether or not the collision of electric signals occurs.

2. The power electronics device according to claim 1, wherein
the connection detection processor generates an electric signal for notifying an existence of the power electronics device, to the power line with use of the power controller, and
the collision monitor performs a control so as to stop generating of the electric signal when detecting, during the generating of the electric signal, that another power electronics device generates an electric signal to the power line.

3. The power electronics device according to claim 2, wherein
the collision monitor controls the connection detection processor to generate the electric signal again with use of the power controller, when detecting that the other power electronics device stops generating the electric signal.

4. The power electronics device according to claim 1, wherein
the connection detection processor generates an electric signal for notifying an existence of the power electronics device, to the power line with use of the power controller, and determines that the power electronics device has a connection relationship with the other power electronics device through the power line when the power controller detects an electric signal generated from the other power electronics device on the power line after the generating of the electric signal by the connection detection processor is completed.

5. The power electronics device according to claim 1, further comprising
a communicator that performs wireless or wired communication with another power electronics device, wherein
the connection detection processor generates an electric signal for notifying an existence of the power electronics device, to the power line with use of the power controller, and determines that the power electronics device has a connection relationship with the other power electronics device through the power line when the communicator receives a communication message notifying detection of the generated electric signal from the other power electronics device after the generating of the electric signal by the connection detection processor is completed.

6. The power electronics device according to claim 1, further comprising
a communicator that performs wireless or wired communication with another power electronics device, wherein
the connection detection processor transmits a communication message regarding preliminary notice of generating an electric signal for notifying an existence of the power electronics device, to another power electronics device with use of the communicator, thereafter generates the electric signal to the power line with use of the power controller, and determines that the power electronics device has a connection relationship with the other power electronics device through the power line when receiving a communication message notifying detection of the generated electric signal from the other power electronics device via the communicator after the generating of the electric signal by the connection detection processor is completed.

7. The power electronics device according to claim 6, wherein
the collision monitor performs a control so as to stop the generating of the electric signal when detecting, during the generating of the electric signal, that the other power electronics device generates an electric signal to the power line, and
the collision monitor controls the connection detection processor to transmit the communication message and generate the electric signal with use of the power controller, when detecting that the other power electronics device stops generating the electric signal.

8. The power electronics device according to claim 1, further comprising
a communicator that performs wireless or wired communication with another power electronics device, wherein
the connection detection processor transmits a communication message to instruct generating an electric signal, to the other power electronics device with use of the communicator, and thereafter determines that the power electronics device has a connection relationship with the other power electronics device through the power line when detecting an electric signal generated from the other power electronics device on the power line via the power controller.

9. The power electronics device according to claim 1, wherein
the connection detection processor assigns a specific identifier to a whole of the power electronics device and other power electronics devices connected to the power line, and update the specific identifier when a connection relationship with a new power electronics device different from the other power electronics devices through the power line is confirmed, or when a connection relationship with at least one of the other power electronics devices is no longer confirmed through the power line.

10. A power electronics device comprising:
a connector connected to a power line;
a communicator that performs wired or wireless communication with another power electronics device;
a power controller that performs at least detecting an electric signal on the power line among the detecting an electric signal on the power line and generating an electric signal to the power line via the connector; and
a connection detection processor that transmits a value of the electric signal detected by the power controller to the other power electronics device with use of the communicator, receives a value of an electric signal detected by the other power electronics device from the other power electronics device, and determines that the power electronics device has a connection relationship with the other power electronics device through the power line when the value of the electric signal detected by the power controller and the value of the electric signal received from the other power electronics device fall within a predetermined range, respectively.

11. A device detection method comprising:
performing a connection detection process by carrying out at least one of generating an electric signal to a power line and detecting an electric signal on the power line to detect another power electronics device connected to the power line; and
monitoring whether or not collision of electric signals occurs on the power line during the connection detection process and controlling the connection detection process according to a monitoring result of whether or not the collision of electric signals occurs.

12. A non-transitory computer readable medium having instructions stored therein which when executed by a processor, causes the processor to perform processing of steps comprising:
performing a connection detection process by carrying out at least one of generating an electric signal to a power line and detecting an electric signal on the power line to detect another power electronics device connected to the power line; and
monitoring whether or not collision of electric signals occurs on the power line during the connection detection process and controlling the connection detection process according to a monitoring result of whether or not the collision of electric signals occurs.

* * * * *